US012722699B2

(12) United States Patent
Kodera

(10) Patent No.: US 12,722,699 B2
(45) Date of Patent: Sep. 1, 2026

(54) STEERING CONTROL DEVICE

(71) Applicant: JTEKT CORPORATION, Kariya (JP)

(72) Inventor: Takashi Kodera, Okazaki (JP)

(73) Assignee: JTEKT CORPORATION, Kariya (JP)

(*) Notice: Subject to any disclaimer, the term of this patent is extended or adjusted under 35 U.S.C. 154(b) by 58 days.

(21) Appl. No.: 18/856,946

(22) PCT Filed: Apr. 28, 2022

(86) PCT No.: PCT/JP2022/019261
§ 371 (c)(1),
(2) Date: Oct. 15, 2024

(87) PCT Pub. No.: WO2023/209940
PCT Pub. Date: Nov. 2, 2023

(65) Prior Publication Data

US 2025/0256768 A1 Aug. 14, 2025

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01)

(58) Field of Classification Search
CPC ....... B62D 6/008; B62D 5/0463; B62D 5/046
See application file for complete search history.

(56) References Cited

U.S. PATENT DOCUMENTS

2007/0114094 A1 5/2007 Tamaizumi
2014/0195122 A1* 7/2014 Oniwa .................. G05D 17/02 701/41
2014/0343794 A1 11/2014 Tamaizumi et al.
2017/0066475 A1* 3/2017 Kudo ....................... B62D 6/10
2017/0066476 A1* 3/2017 Kudo ................... B62D 5/0463
2017/0369095 A1* 12/2017 Kodera ................ B62D 5/0421
2018/0273026 A1* 9/2018 Oyama ........... B60W 30/18145
2019/0233001 A1 8/2019 Namikawa et al.
(Continued)

FOREIGN PATENT DOCUMENTS

JP 2007-083827 A 4/2007
JP 2012 159455 A 8/2012
(Continued)

OTHER PUBLICATIONS

May 20, 2025 extended Search Report issued in European Patent Application No. 22940216.9.
(Continued)

*Primary Examiner* — Joseph J Dallo
(74) *Attorney, Agent, or Firm* — Oliff PLC

(57) ABSTRACT

A steering control device operates a motor mechanically connected to an operation member. The motor is a drive source for a plant mounted on a vehicle. The steering control device performs a torque feedback process, an operation process, and a characteristic change process. The torque feedback process includes a process of calculating a manipulated variable for controlling steering torque to target steering torque. The operation process is a process of operating a drive circuit for the motor based on the manipulated variable. The characteristic change process is a process of changing a response characteristic of feedback control according to a plant state of the plant.

17 Claims, 10 Drawing Sheets

(56) References Cited

U.S. PATENT DOCUMENTS

| | | | | |
|---|---|---|---|---|
| 2020/0130737 A1* | 4/2020 | Kodera | .................. | B62D 6/008 |
| 2020/0324808 A1* | 10/2020 | Kodera | ................ | B62D 5/0463 |
| 2020/0382040 A1* | 12/2020 | Suzuki | ................ | B62D 5/0493 |
| 2021/0016827 A1 | 1/2021 | Suzuki | | |
| 2025/0256768 A1* | 8/2025 | Kodera | .................. | B62D 6/008 |

FOREIGN PATENT DOCUMENTS

| | | |
|---|---|---|
| JP | 2014-223832 A | 12/2014 |
| JP | 2020 175693 A | 10/2020 |
| WO | 2013/018420 A1 | 2/2013 |

OTHER PUBLICATIONS

Jul. 26, 2022 International Search Report issued in International Patent Application No. PCT/JP2022/019261.

* cited by examiner

Taf
Th
V
θb
M19
M20
BASE TARGET TORQUE CALCULATION PROCESS
Th*
M22
TARGET REACTION FORCE CALCULATION PROCESS
Ts*
M24
REACTION FORCE OPERATION PROCESS
iu1, iv1, iw1
MSs
θa
M10
STEERING ANGLE CALCULATION PROCESS
θh
M14
TARGET PINION ANGLE CALCULATION PROCESS
θp*
M12
PINION ANGLE CALCULATION PROCESS
θp
M16
PINION ANGLE FEEDBACK PROCESS
Tt*
M18
STEERING OPERATION PROCESS
iu2, iv2, iw2
MSt

Th
Th*
Kip
(Kor, Ktp, Kpp)
M50
ΔTh
M60
M62
Kp
M64
Gp
LARGE
SMALL
Kip1
Kip2
M66
Tsp
M70
M72
s
M74
Kd
M76
Gd
Kip3
Kip4
M78
Tsd
M80
Tspd
M82
Tsi
M84
Ts*

Th
Th*
Sst
M50
+
−
ΔTh
M60
M70
M62
Kp
M240
GAIN
Gp1
Gp2
Sst
1
0
Gp
M66
M242
M72
s
M74
Kd
M250
GAIN
Gd1
Gd2
Sst
1
0
Gd
M78
M252
Tsp
Tsd
M80
+
+
Tspd
M82
Tsi
M84
+
+
Ts*

Th
Th*
Sst
M50
+
−
ΔTh
M60
M70
M62
Kp
M262
CUTOFF FREQUENCY
Sst
Fp1
1
Fp2
0
Fp
M264
M260
1
(Tp•s+1)
Tsp
M72
s
M74
Kd
M272
M274
M270
ad•Td•s+1
(Td•s+1)
Tsd
M80
+
+
Tspd
M82
Tsi
M84
+
+
Ts*

STEERING CONTROL DEVICE

CROSS-REFERENCE TO RELATED APPLICATIONS

This application is national stage application of International Application No. PCT/JP2022/019261, filed on Apr. 28, 2022, which designates the United States, the entire contents of which are incorporated herein by reference.

TECHNICAL FIELD

The present disclosure relates to steering control devices and steering control methods.

BACKGROUND ART

For example, Patent Document 1 below describes a control device that performs feedback control to control, to a target value, steering torque that is torque to be applied to a steering wheel.

RELATED ART DOCUMENTS

Patent Documents

Patent Document 1: Japanese Unexamined Patent Application Publication No. 2014-223832 (JP 2014-223832 A)

SUMMARY OF THE INVENTION

Problem to be Solved by the Invention

The issue with performing such feedback control on torque is to balance stability and responsiveness.

Means for Solving the Problem

An aspect of the present disclosure provides a steering control device configured to operate a motor mechanically connected to an operation member to be operated by a driver to steer a vehicle. The motor is a drive source for a plant mounted on the vehicle. The steering control device is configured to perform a torque feedback process, an operation process, and a characteristic change process. The torque feedback process includes a process of calculating a manipulated variable for controlling steering torque to target steering torque by feedback control. The steering torque is torque input to the operation member. The operation process is a process of operating a drive circuit for the motor based on the manipulated variable. The characteristic change process is a process of changing a response characteristic of the feedback control according to a plant state of the plant.

Another aspect of the present disclosure provides a steering control method for operating a motor mechanically connected to an operation member to be operated by a driver to steer a vehicle. The motor is a drive source for a plant mounted on the vehicle. The steering control method includes performing a torque feedback process, performing an operation process, and performing a characteristic change process. The torque feedback process includes a process of calculating a manipulated variable for controlling steering torque to target steering torque by feedback control. The steering torque is torque input to the operation member. The operation process is a process of operating a drive circuit for the motor based on the manipulated variable. The characteristic change process is a process of changing a response characteristic of the feedback control according to a plant state of the plant.

MODES FOR CARRYING OUT THE INVENTION

First Embodiment

A steering control device according to a first embodiment will be described below with reference to the drawings.

Prerequisite Configuration

Figure 1:
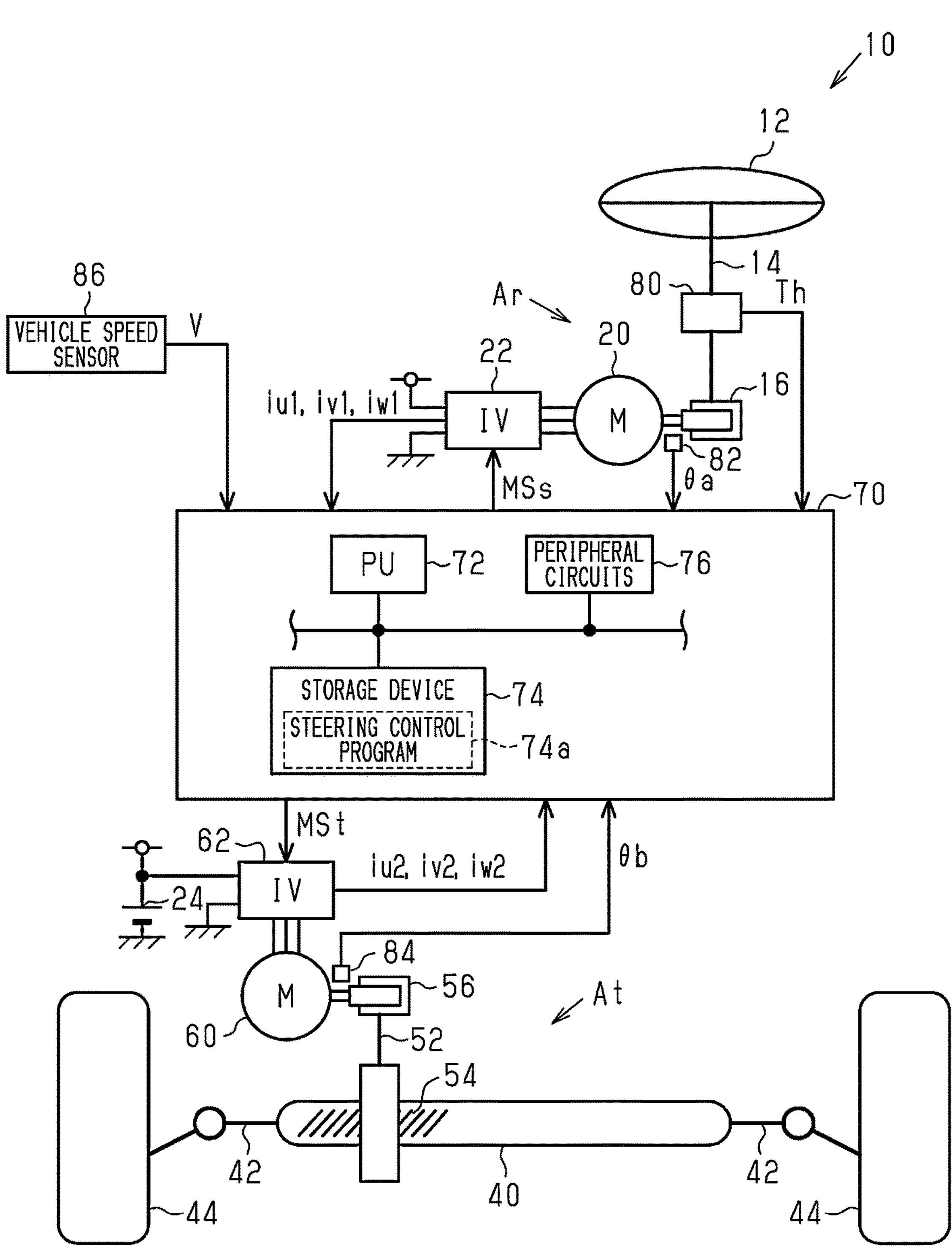
FIG. 1 is a diagram showing the configuration of a steering system according to a first embodiment.

As shown in FIG. 1, a steering system 10 mounted on a vehicle includes a reaction force actuator Ar and a steering actuator At. The steering system 10 of the present embodiment has a structure in which a power transmission path between a steering wheel 12 that is an operation member and steered wheels 44 is mechanically disconnected. That is, the steering system 10 includes a steer-by-wire steering device.

A steering shaft 14 is connected to the steering wheel 12. The reaction force actuator Ar is an actuator that applies a steering reaction force to the steering wheel 12. The steering reaction force refers to a force that acts in an opposite direction to a direction in which the steering wheel 12 is operated by a driver. Applying the steering reaction force to the steering wheel 12 can provide a suitable tactile feedback to the driver. The reaction force actuator Ar includes a speed reduction mechanism 16, a reaction force motor 20, and a reaction force inverter 22.

The reaction force motor 20 is a three-phase brushless motor. The reaction force motor 20 is a surface permanent magnet synchronous motor. A rotating shaft of the reaction force motor 20 is connected to the steering shaft 14 via the speed reduction mechanism 16. The reaction force inverter 22 is a power conversion circuit that converts a voltage VB of a battery 24 that is a direct current voltage source to an alternating current voltage and applies the alternating current voltage to the reaction force motor 20. In the present embodiment, the reaction force motor 20 is an example of a drive source for the reaction force actuator Ar.

A steered shaft 40 extends in a vehicle width direction that is a left-right direction in FIG. 1. The right and left steered wheels 44 are connected to both ends of the steered shaft 40 via tie rods 42. The steered angle of the steered wheels 44 is changed as the steered shaft 40 makes a linear motion.

The steering actuator At includes a speed reduction mechanism 56, a steering motor 60, and a steering inverter 62. The steering motor 60 is a three-phase brushless motor. A rotating shaft of the steering motor 60 is connected to a pinion shaft 52 via the speed reduction mechanism 56. Pinion teeth of the pinion shaft 52 mesh with rack teeth 54 of the steered shaft 40. The pinion shaft 52 and the steered shaft 40 with the rack teeth 54 form a rack and pinion mechanism. Torque of the steering motor 60 is applied as a steering force to the steered shaft 40 via the pinion shaft 52. The steered shaft 40 moves in the vehicle width direction that is the left-right direction in FIG. 1 in response to rotation of the steering motor 60. In the present embodiment, the steering motor 60 is an example of a drive source for the steering actuator At.

The steering system 10 includes a control device 70. The control device 70 is an example of a steering control device that controls a steering device. More specifically, the steering wheel 12 of the steering device is a controlled object of the control device 70. The control device 70 operates the reaction force actuator Ar in order to control the steering reaction force that is a controlled variable for the controlled object. An operation signal MSs for the reaction force inverter 22 is shown in FIG. 1. The steered wheels 44 of the steering device are also controlled objects of the control device 70. The control device 70 operates the steering actuator At in order to control the steered angle of the steered wheels 44 that is a controlled variable for the controlled objects. The steered angle is a turning angle of tires. An operation signal MSt for the steering inverter 62 is shown in FIG. 1.

The control device 70 refers to steering torque Th detected by a torque sensor 80, namely input torque to the steering shaft 14, in order to control the controlled variable. The torque sensor 80 includes a torsion bar connected to the steering shaft 14, and a sensing element that detects a torsion angle of the torsion bar. The control device 70 also refers to a rotation angle θa of the rotating shaft of the reaction force motor 20 detected by a rotation angle sensor 82. The control device 70 also refers to currents iu1, iv1, and iw1 flowing through the reaction force motor 20. The currents iu1, iv1, and iw1 are quantified as voltage drops across shunt resistors provided in legs of the reaction force inverter 22. The control device 70 refers to a rotation angle θb of the rotating shaft of the steering motor 60 detected by a rotation angle sensor 84 in order to control the controlled variable. The control device 70 also refers to currents iu2, iv2, and iw2 flowing through the steering motor 60. The currents iu2, iv2, and iw2 are quantified as voltage drops across shunt resistors provided in legs of the steering inverter 62. The control device 70 also refers to a vehicle speed V detected by a vehicle speed sensor 86.

The control device 70 includes a PU 72, a storage device 74, and peripheral circuits 76. The PU 72 is a software processing device such as a CPU, a GPU, and a TPU. The storage device 74 includes a storage medium such an electrically rewritable nonvolatile memory and a disk medium. The storage device 74 stores a steering control program 74*a*. The peripheral circuits 76 include a circuit for generating a clock signal that regulates internal operations, a power supply circuit, and a reset circuit. The control device 70 controls the controlled variables by the PU 72 executing the steering control program 74*a* stored in the storage device 74.

Control

Figure 2:
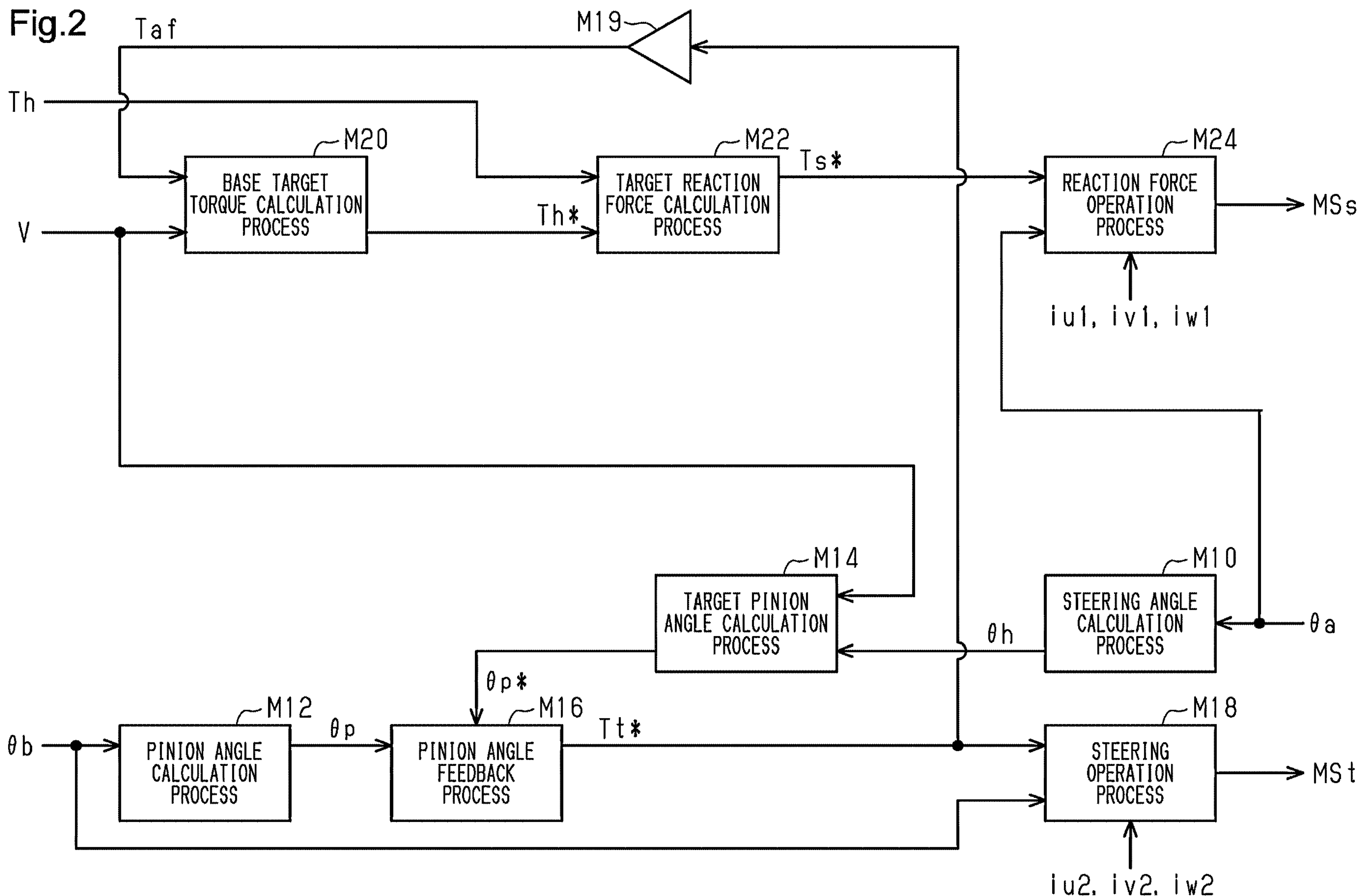
FIG. 2 is a block diagram showing processes that are performed by a control device according to the first embodiment.

FIG. 2 shows part of processes that are performed by the control device 70.

A steering angle calculation process M10 is a process of calculating a steering angle θh that is a rotation angle of the steering wheel 12 by using the rotation angle θa as an input. The steering angle calculation process M10 includes a process of converting the rotation angle θa to, for example, a cumulative angle including a range exceeding 360° by counting the number of revolutions of the reaction force motor 20 from a neutral steering position that is the position of the steering wheel 12 when the vehicle is traveling straight. The steering angle calculation process M10 includes a process of calculating the steering angle θh by multiplying the cumulative angle obtained by the conversion by a conversion factor that is based on a rotational speed ratio of the speed reduction mechanism 16. For example, the steering angle θh is positive when it is an angle to the right of the neutral steering position, and is negative when it is an angle to the left of the neutral steering position.

A pinion angle calculation process M12 is a process of calculating a pinion angle θp that is a rotation angle of the pinion shaft 52 by using the rotation angle θb as an input. The pinion angle calculation process M12 includes a process of converting to, for example, a cumulative angle including a range exceeding 360° by counting the number of revolutions of the steering motor 60 from a neutral rack position that is the position of the steered shaft 40 when the vehicle is traveling straight. The pinion angle calculation process M12 includes a process of calculating the pinion angle θp that is an actual rotation angle of the pinion shaft 52 by multiplying the cumulative angle obtained by the conversion by a conversion factor that is based on a rotational speed ratio of the speed reduction mechanism 56. For example, the pinion angle θp is positive when it is an angle to the right of the neutral rack position, and is negative when it is an angle to the left of the neutral rack position. The steering motor 60 and the pinion shaft 52 operate in conjunction with each other via the speed reduction mechanism 56. Therefore, there is a one-to-one correspondence between a cumulative value of the rotation angle θb of the steering motor 60 and the pinion angle θp. The pinion angle θp can be obtained from the rotation angle θb of the steering motor 60 using this correspondence. The pinion shaft 52 meshes with the steered shaft 40. Therefore, there is also a one-to-one correspondence between the pinion angle θp and the amount of movement of the steered shaft 40. There is also a one-to-one correspondence between the pinion angle θp and the steered angle of the steered wheels 44. In the present embodiment, the pinion angle θp is an example of information that can be acquired in the steering actuator At and is an example of a converted steered angle.

A target pinion angle calculation process M14 is a process of calculating a target pinion angle θp* as a target steered angle by using the steering angle θh and the vehicle speed V as inputs. The target pinion angle θp* is a target value of the pinion angle θp according to the operation of the steering wheel 12 by the driver. The target pinion angle calculation process M14 includes a process of variably setting a steering angle ratio Dr according to the vehicle speed V. Accordingly, the value of the target pinion angle θp* output through the target pinion angle calculation process M14 varies according to the vehicle speed V even when the input steering angle θh is the same.

A pinion angle feedback process M16 is a process of calculating a steering torque command value Tt* as a steering manipulated variable in order to control the pinion angle θp to the target pinion angle θp* by feedback control. The steering torque command value Tt* is a command value for the torque of the steering motor 60. In the present embodiment, the pinion angle feedback process M16 is an example of a steering feedback process.

A steering operation process M18 is a process of outputting the operation signal MSt for the steering inverter 62 by using the steering torque command value Tt*, the currents iu2, iv2, and iw2, and the rotation angle θb as inputs. The steering operation process M18 includes a process of calculating dq-axis current command values It* as target steering currents based on the steering torque command value Tt*. The steering operation process M18 includes a process of calculating dq-axis currents It as actual steering currents based on the currents iu2, iv2, and iw2 and the rotation angle θb. The steering operation process M18 includes a process of calculating the operation signal MSt in order to operate the steering inverter 62 so that the dq-axis currents It are brought to the current command values It*. That is, the steering operation process M18 is an example of an operation process for performing a steering current feedback process for the dq-axis currents It. In the present embodiment, the operation signal MSt is an example of a steering current manipulated variable.

An axial force calculation process M19 includes a process of calculating an axial force Taf by using the steering torque command value Tt* as an input. The axial force Taf is a force in the axial direction that is applied to the steered shaft 40. Instead of using the steering torque command value Tt* as the input, the axial force calculation process M19 may use the current command values It* or the dq-axis currents It as the input.

A base target torque calculation process M20 is a process of calculating, based on the axial force Taf, base target torque Thb* that is a base value of target steering torque Th* to be input to the steering shaft 14 by the driver via the steering wheel 12. Since the axial force Taf is a quantity according to a lateral force acting on the steered wheels 44, the lateral force can be known from the axial force Taf. It is desirable that torque to be input to the steering shaft 14 by the driver via the steering wheel 12 be determined according to the lateral force. Therefore, the base target torque calculation process M20 is a process of calculating the base target torque Thb* according to the lateral force known from the axial force Taf.

More specifically, the base target torque calculation process M20 is a process of variably setting an absolute value of the base target torque Thb* according to the vehicle speed V even when an absolute value of the axial force Taf is the same. This process may be a process of calculating the absolute value of the base target torque Thb* so that the absolute value of the base target torque Thb* when the vehicle speed Vis small is equal to or less than the absolute value of the base target torque Thb* when the vehicle speed V is large. For example, this can be implemented by the PU 72 calculating the base target torque Thb* through a map calculation using map data stored in advance in the storage device 74. The map data is data whose input variables are the axial force Taf or a lateral acceleration known from the axial force Taf and the vehicle speed V and whose output variable is the base target torque Thb*.

The map data is a data set of discrete values of the input variables and values of the output variable corresponding to the values of the input variables. The map calculation may be a process in which, when the values of the input variables match any of the values of the input variables in the map data, a corresponding value of the output variable in the map data is output as a calculation result. The map calculation may be a process in which, when the values of the input variables do not match any of the values of the input variables in the map data, a value obtained by interpolating a plurality of values of the output variable included in the map data is output as a calculation result. Alternatively, the map calculation may be a process in which, when the values of the input variables do not match any of the values of the input variables in the map data, the value of the output variable in the map data that corresponds to the values of the input variables in the map data closest to the values of the input variables, out of the plurality of values of the output variables included in the map data, is output as a calculation result.

A target reaction force calculation process M22 is a process of calculating a target reaction force Ts* according to the steering reaction force to be applied to the steering wheel 12, by using the steering torque Th and the target steering torque Th* as inputs. The target reaction force Ts* is actually a command value for the torque of the reaction force motor 20. The steering reaction force is a value obtained by multiplying the target reaction force Ts* by a coefficient according to the reduction ratio of the speed reduction mechanism 16. In the present embodiment, the target reaction force calculation process M22 is an example of a torque feedback process.

A reaction force operation process M24 is a process of outputting the operation signal MSs for the reaction force inverter 22 by using the target reaction force Ts*, the currents iu1, iv1, and iw1, and the rotation angle θa as inputs. The reaction force operation process M24 includes a process of calculating dq-axis current command values Is* as target currents based on the target reaction force Ts*. The reaction force operation process M24 includes a process of calculating dq-axis currents Is as actual currents based on the currents iu1, iv1, and iw1 and the rotation angle θa. The reaction force operation process M24 includes a process of calculating the operation signal MSs in order to operate the reaction force inverter 22 so that the dq-axis currents Is are brought to the current command values Is*. That is, the reaction force operation process M24 is an example of an operation process for performing a current feedback process for the dq-axis currents Is. In the present embodiment, the operation signal MSs is an example of a current manipulated variable.

Figure 3:
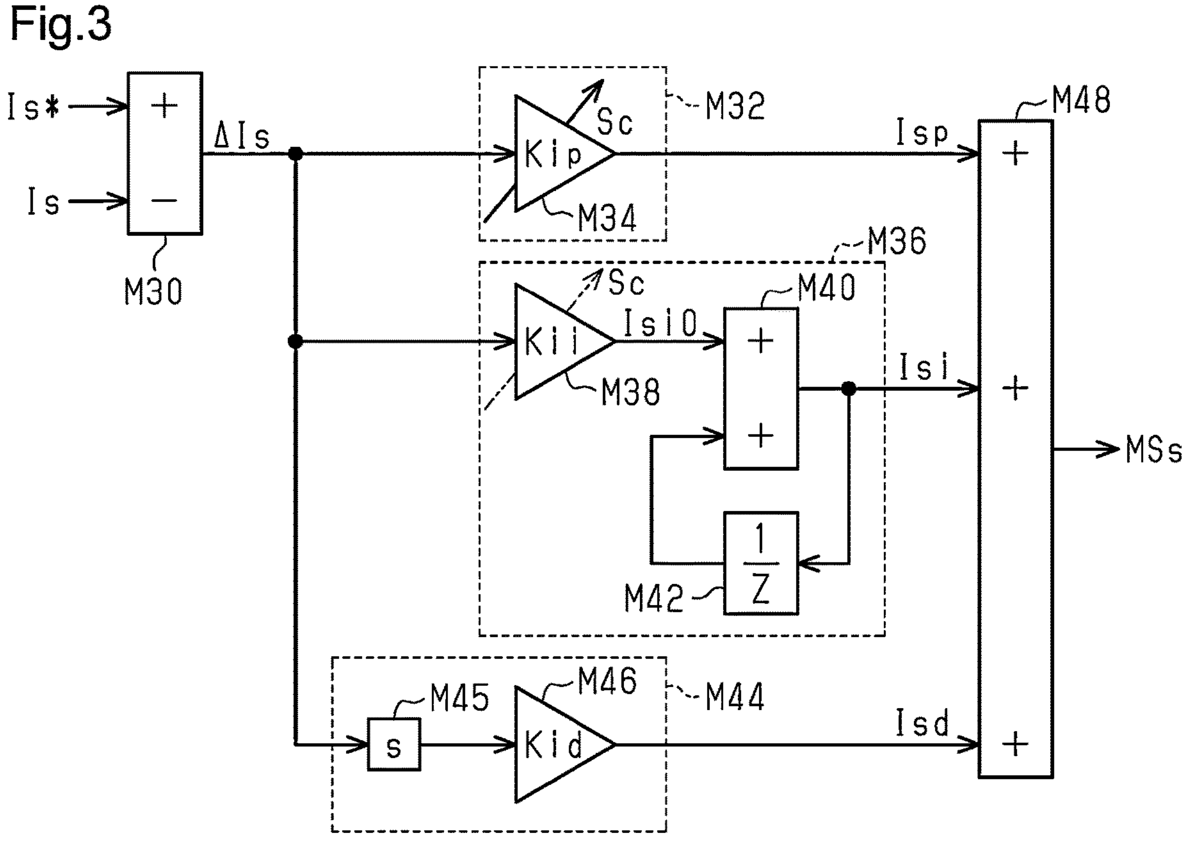
FIG. 3 is a block diagram showing details of a reaction force operation process that is performed by the control device according to the first embodiment.

FIG. 3 shows details of the reaction force operation process M24. A current deviation calculation process M30 is a process of calculating a current deviation ΔIs that is a value obtained by subtracting the dq-axis currents Is from the current command values Is*.

A current proportional element M32 is a process that takes the current deviation ΔIs as an input and outputs a current proportional output value Isp that is a value proportional to the current deviation ΔIs. More specifically, a current proportional gain multiplication process M34 is a process of multiplying the current deviation ΔIs by a current proportional gain Kip. The current proportional gain Kip is a value that changes based on a state variable Sc. For example, the state variable Sc is the result of identifying the state of the vehicle or the steering system 10. The state of the vehicle is, for example, the magnitude of the vehicle speed V. The state of the steering system 10 is, for example, at least one of the heat generation state of the reaction force motor 20, the magnitudes of the dq-axis currents Is, the state of the voltage VB of the battery 24, the magnitude of the steering angle θh, and the magnitude of a derivative of the steering angle θh. In the reaction force operation process M24, the state variable Sc may be calculated based on related information, or may be input from another process for calculating the state variable Sc based on a related state.

A current proportional gain multiplication process M34 is a process in which, for example, when the state variable Sc refers to the vehicle speed V, the current proportional gain Kip when the value of the state variable Sc is large is equal to or greater than the current proportional gain Kip when the value of the state variable Sc is small. This process may be, for example, a process in which the PU 72 calculates the current proportional gain Kip through a map calculation using map data stored in advance in the storage device 74. The map data is data whose input variable is the state variable Sc and whose output variable is the value of the current proportional gain Kip.

A current integral element M36 is a process that takes the current deviation ΔIs as an input and outputs a current integral output value Isi that is a value obtained by integrating the current deviation ΔIs. More specifically, a current integral gain multiplication process M38 is a process of outputting a base value Isi0 that is a value obtained by multiplying the current deviation ΔIs by a current integral gain Kii. The current integral gain Kii is, for example, a fixed value other than 0 (zero). The current integral gain Kii may be a value that changes based on the state variable Sc similarly to the current proportional gain Kip. An integration process M40 is a process of adding together the base value Isi0 and a previous value of the current integral output value Isi and outputting the sum as the current integral output value Isi. The previous value of the current integral output value Isi is a value held during the process in a previous cycle through a previous value holding process M42.

A current derivative element M44 is a process that takes the current deviation ΔIs as an input and outputs a current derivative output value Isd that is a value proportional to the first-order time derivative of the current deviation ΔIs. More specifically, a linear operator M45 is a process of calculating the first-order time derivative of the current deviation ΔIs. A current derivative gain multiplication process M46 is a process of multiplying an output value of the linear operator M45 by a current derivative gain Kid. The current derivative gain Kid is, for example, a fixed value other than 0 (zero). The current derivative gain Kid may be a value that changes based on the state variable Sc similarly to the current proportional gain Kip. In the present embodiment, the current proportional gain Kip, the current integral gain Kii, and the current derivative gain Kid are examples of a current control gain.

An addition process M48 is a process of outputting, as the operation signal MSs, a value obtained by adding together the output value of the current proportional element M32, the output value of the current integral element M36, and the output value of the current derivative element M44.

Figure 4:
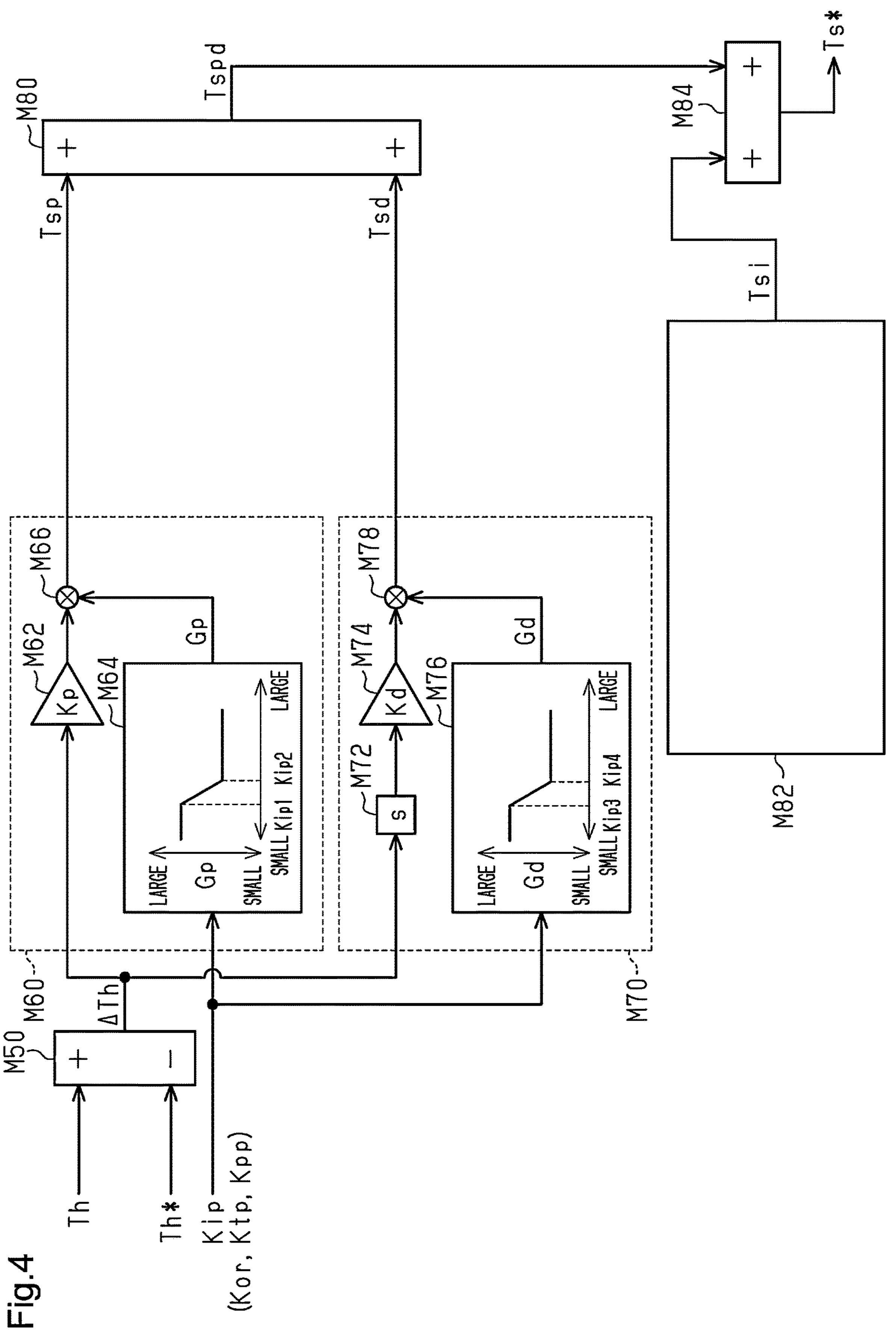
FIG. 4 is a block diagram showing details of a target reaction force calculation process that is performed by the control device according to the first embodiment.

FIG. 4 shows details of the target reaction force calculation process M22. A torque deviation calculation process M50 is a process of calculating a torque deviation ΔTh that is a value obtained by subtracting the target steering torque Th* from the steering torque Th.

A torque proportional element M60 is a process that takes the torque deviation ΔTh as an input and outputs a value proportional to the torque deviation ΔTh. More specifically, a torque proportional gain multiplication process M62 is a process of multiplying the torque deviation ΔTh by a torque proportional gain Kp. A torque proportional variable gain calculation process M64 is a process of calculating a torque proportional variable gain Gp by using the value of the current proportional gain Kip as an input. The torque proportional variable gain calculation process M64 is, for example, a process in which the torque proportional variable gain Gp when the value of the current proportional gain Kip is large is equal to or less than the torque proportional variable gain Gp when the value of the current proportional gain Kip is small. This process may be, for example, a process in which the PU 72 performs a map calculation of the torque proportional variable gain Gp using map data stored in advance in the storage device 74. The map data is data whose input variable is the value of the current proportional gain Kip and whose output variable is the value of the torque proportional variable gain Gp. In the present embodiment, the torque proportional variable gain calculation process M64 is an example of a characteristic change process.

More specifically, the torque proportional variable gain Gp is a constant value when the value of the current proportional gain Kip is equal to or less than a first threshold value Kip1 and equal to or greater than a second threshold value Kip2. However, the value of the torque proportional variable gain Gp differs between the case where the value of the current proportional gain Kip is equal to or less than the first threshold value Kip1 and the case where the value of the current proportional gain Kip is equal to or greater than the second threshold value Kip2. When the value of the current proportional gain Kip is greater than the first threshold value Kip1 and less than the second threshold value Kip2, the torque proportional variable gain Gp is a value that monotonically decreases according to the value of the current proportional gain Kip.

A torque proportional variable gain multiplication process M66 is a process of multiplying the output value of the torque proportional gain multiplication process M62 by the torque proportional variable gain Gp. A torque proportional output value Tsp that is the output value of the torque proportional variable gain multiplication process M66 is the output value of the torque proportional element M60. That is, the gain of the torque proportional element M60 is a value obtained by multiplying the torque proportional gain Kp by the torque proportional variable gain Gp.

A torque derivative element M70 is a process that takes the torque deviation ΔTh as an input and outputs a value proportional to the first-order time derivative of the torque deviation ΔTh. More specifically, a linear operator M72 is a process of calculating the first-order time derivative of the torque deviation ΔTh. A torque derivative gain multiplication process M74 is a process of multiplying the output value of the linear operator M72 by a torque derivative gain Kd. A torque derivative variable gain calculation process M76 is a process of calculating a torque derivative variable gain Gd by using the value of the current proportional gain Kip as an input. The torque derivative variable gain calculation process M76 is, for example, a process in which the torque derivative variable gain Gd when the value of the current proportional gain Kip is large is equal to or less than the torque derivative variable gain Gd when the value of the current proportional gain Kip is small. This process may be, for example, a process in which the PU 72 performs a map calculation of the torque derivative variable gain Gd using map data stored in advance in the storage device 74. The map data is data whose input variable is the value of the current proportional gain Kip and whose output variable is the value of the torque derivative variable gain Gd. In the present embodiment, the torque derivative variable gain calculation process M76 is an example of the characteristic change process.

More specifically, the torque derivative variable gain Gd is a constant value when the value of the current proportional gain Kip is equal to or less than a third threshold value Kip3 and equal to or greater than a fourth threshold value Kip4. However, the value of the torque derivative variable gain Gd differs between the case where the value of the current proportional gain Kip is equal to or less than the third threshold value Kip3 and the case where the value of the current proportional gain Kip is equal to or greater than the fourth threshold value Kip4. When the value of the current proportional gain Kip is greater than the third threshold value Kip3 and less than the fourth threshold value Kip4, the torque derivative variable gain Gd is a value that monotonically decreases according to the value of the state variable Sc. The first threshold value Kip1 and the third threshold value Kip3 may be the same. The second threshold value Kip2 and the fourth threshold value Kip4 may be the same.

A torque derivative variable gain multiplication process M78 is a process of multiplying the output value of the torque derivative gain multiplication process M74 by the torque derivative variable gain Gd. A torque derivative output value Tsd that is the output value of the torque derivative variable gain multiplication process M78 is the output value of the torque derivative element M70. That is, the gain of the torque derivative element M70 is a value obtained by multiplying the torque derivative gain Kd by the torque derivative variable gain Gd.

An addition process M80 is a process of adding together the torque proportional output value Tsp of the torque proportional element M60 and the torque derivative output value Tsd of the torque derivative element M70 and outputting the sum as a PD manipulated variable Tspd.

A second manipulated variable calculation process M82 is a process of calculating a second manipulated variable Tsi that is a manipulated variable other than the PD manipulated variable Tspd and is used for controlling the steering torque Th to the target steering torque Th*. The second manipulated variable calculation process M82 may include, for example, at least one of processes (A) to (H) described below.

The process (A) is a process of calculating a manipulated variable according to a cumulative value of a value obtained by subtracting the steering torque Th from an estimated axial force. The estimated axial force is a value equivalent to the torque of the reaction force motor 20. The estimated axial force is a value calculated by the PU 72 inputting the currents iu1, iv1, and iw1.

The process (B) is a process of calculating, as a manipulated variable, a cumulative value of a value obtained by multiplying the difference between the steering torque Th and the target steering torque Th* by an integral gain.

The process (C) is a process of calculating a manipulated variable for controlling steering torque estimated by a disturbance observer to the target steering torque Th*. The process (C) takes, as inputs, the steering angle θh, the torque of the reaction force motor 20 calculated from the currents iu1, iv1, and iw1, etc.

The process (D) is a process of calculating an open loop manipulated variable in which the steering torque Th is taken as an input.

The process (E) is a process of calculating an open loop manipulated variable in which the target steering torque Th* is taken as an input.

The process (F) is a process of, when the magnitude of the pinion angle θp is equal to or greater than a predetermined value, calculating a manipulated variable for applying to the steering shaft 14 a force against the magnitude of the pinion angle θp becoming any greater.

The process (G) is a process of, when the magnitude of the steering angle θh is equal to or greater than a predetermined value, calculating a manipulated variable for applying to the steering shaft 14 a force against the magnitude of the steering angle θh becoming any greater.

The process (H) is a process of calculating a manipulated variable for controlling the steering angle θh to a converted steering angle obtained by converting the pinion angle θp to the steering angle θh by feedback control. The converted steering angle is calculated by the PU 72 based on the steering angle ratio determined according to the vehicle speed V by the target pinion angle calculation process M14 and the pinion angle θp.

An addition process M84 is a process of calculating the target reaction force Ts* by adding together the PD manipulated variable Tspd and the second manipulated variable Tsi output through the second manipulated variable calculation process M82.

Functions and Effects of First Embodiment

The stability of the feedback control on the steering torque Th changes depending on a plant state. This is because the responsiveness of the feedback control on the steering torque Th changes depending on the plant state. For example, the feedback control on the steering torque Th is related to the plant to be controlled, and the stability decreases when the responsiveness decreases or increases depending on the plant state.

Figure 5:
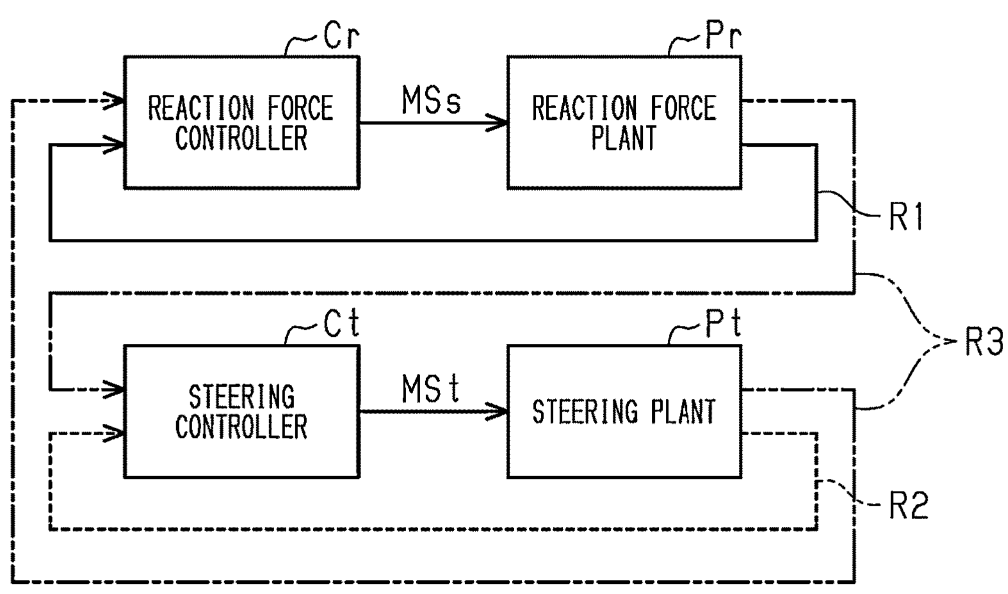
FIG. 5 is a diagram showing closed loops of the steering system according to the first embodiment.

FIG. 5 schematically shows the control configuration of the steering system 10.

The steering system 10 includes a reaction force controller Cr, a reaction force plant Pr, a steering controller Ct, and a steering plant Pt. The reaction force controller Cr includes a process of calculating the operation signal MSs to operate the reaction force inverter 22, and also includes the steering angle calculation process M10, the axial force calculation process M19, the base target torque calculation process M20, the target reaction force calculation process M22, and the reaction force operation process M24. The reaction force plant Pr includes the reaction force actuator Ar. That is, the reaction force plant Pr includes the reaction force motor 20 and the reaction force inverter 22. The steering controller Ct includes a process of calculating the operation signal MSt to operate the steering inverter 62, and also includes the pinion angle calculation process M12, the target pinion angle calculation process M14, the pinion angle feedback process M16, and the steering operation process M18. The steering plant Pt includes the steering actuator At. That is, the steering plant Pt includes the steering motor 60 and the steering inverter 62. In the present embodiment, the process performed by the reaction force controller Cr is an example of a reaction force process. The process performed by the steering controller Ct is an example of a steering process. The reaction force plant Pr and the steering plant Pt are examples of a plant.

The closed loops in the control of the steering system 10 include a closed loop R1, a closed loop R2, and a closed loop R3.

The closed loop R1 includes the reaction force controller Cr and the reaction force plant Pr. The closed loop R1 forms a loop in which the output of the reaction force plant Pr obtained as a result of the reaction force controller Cr operating the reaction force plant Pr based on the operation signal MSs is returned to the input of the reaction force controller Cr. The input and output of the closed loop R1 are, for example, the steering torque Th.

The closed loop R2 includes the steering controller Ct and the steering plant Pt. The closed loop R2 forms a loop in which the output of the steering plant Pt obtained as a result of the steering controller Ct operating the steering plant Pt based on the operation signal MSt is returned to the input of the steering controller Ct. The input and output of the closed loop R2 are, for example, the pinion angle θp obtained from the rotation angle θb of the rotating shaft of the steering motor 60.

The closed loop R3 includes the reaction force controller Cr, the reaction force plant Pr, the steering controller Ct, and the steering plant Pt. The closed loop R3 forms a flow in which the output of the reaction force plant Pr obtained as a result of the reaction force controller Cr operating the reaction force plant Pr based on the operation signal MSs is input to the steering controller Ct. The closed loop R3 further forms a loop in which the output of the steering plant Pt obtained as a result of the steering controller Ct operating the steering plant Pt based on the operation signal MSt is returned to the input of the reaction force controller Cr. In the closed loop R3, the output of the reaction force plant Pr and the input of the steering plant Pt are, for example, the steering angle θh obtained from the rotation angle θa of the rotating shaft of the reaction force motor 20. The output of the steering plant Pt and the input of the reaction force plant Pr are, for example, the dq-axis currents It flowing through the steering motor 60.

The stability of the closed loop R1 changes depending on the state of the reaction force plant Pr. The stability of the closed loop R2 changes depending on the state of the steering plant Pt. The stability of the closed loop R3 changes depending on the states of the reaction force plant Pr and the steering plant Pt. The feedback control on the steering torque Th is affected by the stability of the closed loop R1 and the stability of the closed loop R1 and the closed loop R3.

For example, the steering system 10 is designed to reduce the effect of the feedback control on the steering torque Th on the stability of the closed loop R1. The state of the reaction force plant Pr that causes the change in the stability of the closed loop R1 changes depending on the state of the vehicle or the steering system 10. This causes a change in the state variable Sc and a change in the current proportional gain Kip in the reaction force operation process M24. Such a change in the current proportional gain Kip changes the level of the stability of the feedback control on the steering torque Th in the reaction force controller Cr.

Therefore, when the state of the reaction force plant Pr changes, the PU 72 performs the torque proportional variable gain calculation process M64 and the torque derivative variable gain calculation process M76 that change the response characteristic of the feedback control in order to suppress a decrease in the stability of the feedback control on the steering torque Th.

For example, as shown in FIG. 4, the torque proportional variable gain calculation process M64 is a process in which the torque proportional variable gain Gp when the value of the current proportional gain Kip is large is equal to or less than the torque proportional variable gain Gp when the value of the current proportional gain Kip is small.

The torque proportional variable gain calculation process M64 is a process of reducing the torque proportional variable gain Gp in response to the characteristic of the steering system 10 that the stability of the closed loop R1 decreases as the current proportional gain Kip increases. This corresponds to increasing the stability by reducing the response characteristic of the feedback control in response to the change in the state of the reaction force plant Pr that reduces the stability of the feedback control on the steering torque Th. The torque proportional variable gain calculation process M64 is a process of increasing the torque proportional variable gain Gp in response to the characteristic of the steering system 10 that the stability of the closed loop R1 increases as the current proportional gain Kip decreases. This corresponds to increasing the responsiveness to the change in the reaction force plant Pr that increases the stability of the feedback control on the steering torque Th while ensuring the stability of the feedback control. Thus, when the feedback control on the steering torque Th is performed, higher responsiveness is ensured while ensuring the stability by changing the response characteristic of the feedback control. The same applies to the torque derivative variable gain calculation process M76.

Thus, according to the present embodiment, it is possible to suitably balance the stability and the responsiveness of the feedback control on the steering torque Th.

The embodiment described above further has the following functions and effects.

(1-1) The reaction force operation process M24 is configured to perform the feedback process for the dq-axis currents Is. The feedback control on the dq-axis currents Is includes the process of calculating the operation signal MSs based on the current proportional output value Isp obtained by multiplying the current proportional gain Kip. The target reaction force calculation process M22 includes the torque proportional variable gain calculation process M64 and the torque derivative variable gain calculation process M76. Therefore, it is possible to change the response characteristic so as to suppress a significant decrease in the stability of the feedback control on the steering torque Th in response to the change in the state of the reaction force plant Pr caused by the change in the current proportional gain Kip. Thus, the stability of the feedback control on the steering torque Th can be ensured when the state of the reaction force plant Pr changes due to the change in the current proportional gain Kip.

(1-2) The target reaction force calculation process M22 includes the process of calculating the target reaction force Ts* based on the torque proportional output value Tsp obtained by multiplying the torque proportional gain Kp. The torque proportional variable gain calculation process M64 includes the process of changing the torque proportional gain Kp in order to change the response characteristic of the feedback control on the steering torque Th. Therefore, it is possible to change the response characteristic so as to suppress a significant decrease in the stability of the feedback control on the steering torque Th in response to the change in the state of the reaction force plant Pr.

(1-3) The target reaction force calculation process M22 includes the process of calculating the target reaction force Ts* based on the torque derivative output value Tsd obtained by multiplying the torque derivative gain Kd. The torque derivative variable gain calculation process M76 includes the process of changing the torque derivative gain Kd in order to change the response characteristic of the feedback control on the steering torque Th. Therefore, it is possible to change the response characteristic so as to suppress a significant decrease in the stability of the feedback control on the steering torque Th in response to the change in the state of the reaction force plant Pr.

Second Embodiment

A second embodiment will be described below with reference to the drawings, focusing on the differences from the first embodiment. For convenience of description, the same configurations as those in the first embodiment are denoted by the same signs as those in the first embodiment, and description thereof will be omitted.

In the reaction force operation process M24 according to the present embodiment, the current integral gain Kii is a value that changes based on the state variable Sc similarly to the current proportional gain Kip.

As indicated by the long dashed double-short dashed line in FIG. 3, the current integral gain multiplication process M38 is a process in which, for example, when the state variable Sc refers to the vehicle speed V, the current integral gain Kii when the value of the state variable Sc is large is equal to or greater than the current integral gain Kii when the value of the state variable Sc is small. This process may be, for example, a process in which the PU 72 calculates the current integral gain Kii through a map calculation using map data stored in advance in the storage device 74. The map data is data whose input variable is the state variable Sc and whose output variable is the value of the current integral gain Kii.

Figure 6:
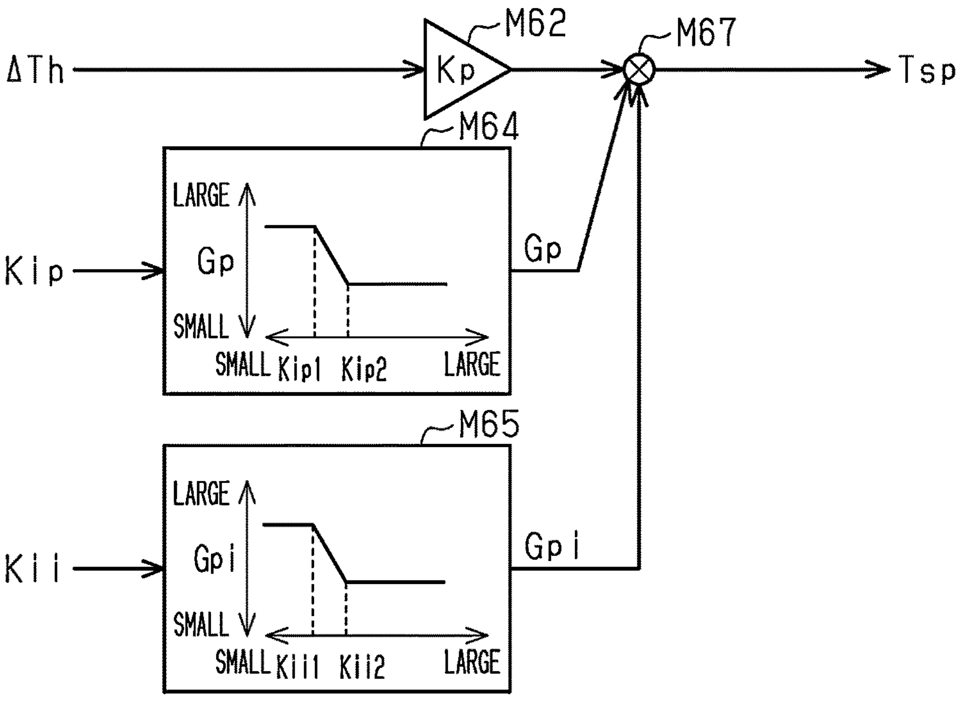
FIG. 6 is a block diagram showing details of a target reaction force calculation process that is performed by a control device according to a second embodiment.

FIG. 6 shows details of the torque proportional element M60 according to the present embodiment.

A torque proportional variable gain calculation process M65 is a process of calculating a torque proportional variable gain Gpi by using the value of the current integral gain Kii as an input. The torque proportional variable gain calculation process M65 is similar to the torque proportional variable gain calculation process M64. In the present embodiment, the torque proportional variable gain calculation process M65 is an example of the characteristic change process.

More specifically, the torque proportional variable gain Gpi is a constant value when the value of the current integral gain Kii is equal to or less than a first threshold value Kii1 and equal to or greater than a second threshold value Kii2. However, the value of the torque proportional variable gain Gpi differs between the case where the value of the current integral gain Kii is equal to or less than the first threshold value Kii1 and the case where the value of the current integral gain Kii is equal to or greater than the second threshold value Kii2. When the value of the current integral gain Kii is greater than the first threshold value Kii1 and less than the second threshold value Kii2, the torque proportional variable gain Gpi is a value that monotonically decreases according to the value of the current integral gain Kii.

A torque proportional variable gain multiplication process M67 is a process of multiplying the output value of the torque proportional gain multiplication process M62 by the torque proportional variable gain Gp and the torque proportional variable gain Gpi. That is, the gain of the torque proportional element M60 is a value obtained by multiplying the torque proportional gain Kp by the torque proportional variable gain Gp and the torque proportional variable gain Gpi.

Figure 7:
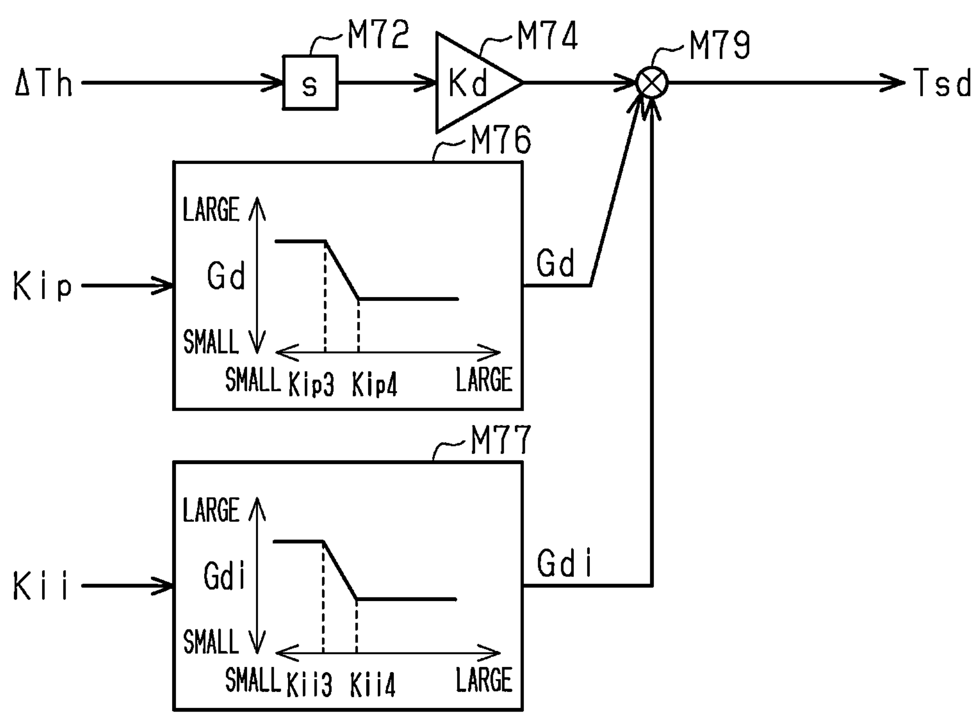
FIG. 7 is a block diagram showing details of the target reaction force calculation process that is performed by the control device according to the second embodiment.

FIG. 7 shows details of the torque derivative element M70 according to the present embodiment.

A torque derivative variable gain calculation process M77 is a process of calculating a torque derivative variable gain Gdi by using the value of the current integral gain Kii as an input. The torque derivative variable gain calculation process M77 is similar to the torque derivative variable gain calculation process M76. In the present embodiment, the torque derivative variable gain calculation process M77 is an example of the characteristic change process.

More specifically, the torque derivative variable gain Gdi is a constant value when the value of the current integral gain Kii is equal to or less than a third threshold value Kii3 and equal to or greater than a fourth threshold value Kii4. However, the value of the torque derivative variable gain Gdi differs between the case where the value of the current integral gain Kii is equal to or less than the third threshold value Kii3 and the case where the value of the current integral gain Kii is equal to or greater than the fourth threshold value Kii4. When the value of the current integral gain Kii is greater than the third threshold value Kii3 and less than the fourth threshold value Kii4, the torque derivative variable gain Gdi is a value that monotonically decreases according to the value of the state variable Sc. The first threshold value Kii1 and the third threshold value Kii3 may be the same. The second threshold value Kii2 and the fourth threshold value Kii4 may be the same.

A torque derivative variable gain multiplication process M79 is a process of multiplying the output value of the torque derivative gain multiplication process M74 by the torque derivative variable gain Gd and the torque derivative variable gain Gdi. That is, the gain of the torque derivative element M70 is a value obtained by multiplying the torque derivative gain Kd by the torque derivative variable gain Gd and the torque derivative variable gain Gdi.

Functions and Effects of Second Embodiment

The feedback control on the dq-axis currents Is includes the process of calculating the operation signal MSs based on the current integral output value Isi obtained by multiplying the current integral gain Kii. The torque proportional element M60 of the target reaction force calculation process M22 includes the torque proportional variable gain calculation process M65 and the torque derivative variable gain calculation process M77. The torque proportional variable gain calculation process M65 is a process of reducing the torque proportional variable gain Gpi in response to the characteristic of the steering system 10 that the stability of the closed loop R1 decreases as the current integral gain Kii increases. Therefore, it is possible to change the response characteristic so as to suppress a significant decrease in the stability of the feedback control on the steering torque Th in response to the change in the state of the reaction force plant Pr caused by the change in the current integral gain Kii. The same applies to the torque derivative variable gain calculation process M77.

The embodiment described above further has the following functions and effects in addition to effects according to (1-2) and (1-3) of the first embodiment.

(2-1) The target reaction force calculation process M22 includes the torque proportional variable gain calculation processes M64, M65 and the torque derivative variable gain calculation processes M76, M77. Therefore, it is possible to change the response characteristic so as to suppress a significant decrease in the stability of the feedback control on the steering torque Th in response to the change in the state of the reaction force plant Pr caused by the changes in the current proportional gain Kip and the current integral gain Kii.

Third Embodiment

A third embodiment will be described below with reference to the drawings, focusing on the differences from the first embodiment. For convenience of description, the same configurations as those in the first embodiment are denoted by the same signs as those in the first embodiment, and description thereof will be omitted.

Figure 8:
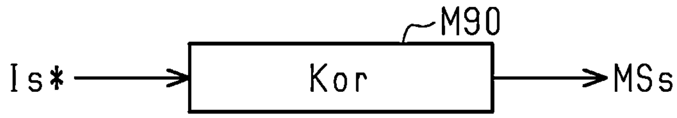
FIG. 8 is a block diagram showing details of a reaction force operation process that is performed by a control device according to a third embodiment.

As shown in FIG. 8, the reaction force operation process M24 according to the present embodiment includes an open loop manipulated variable calculation process M90 for performing feedforward control on the dq-axis currents Is instead of performing feedback control on the dq-axis currents Is.

The open loop manipulated variable calculation process M90 is a process that takes the current command values Is* as an input and outputs current open loop output values Isor that are values proportional to the current command values Is*. More specifically, the open loop manipulated variable calculation process M90 is a process that takes the current command values Is* as an input and multiplies the current command values Is* by a current open loop gain Kor. The current open loop gain Kor is a value that changes based on the state variable Sc. In the open loop manipulated variable calculation process M90, the current open loop output values Isor may be calculated by using the target reaction force Ts* as an input instead of the current command values Is*. In the reaction force operation process M24, the operation signal MSs is calculated based on the current open loop output values Isor. In the present embodiment, the open loop manipulated variable calculation process M90 is an example of a current open loop process.

As shown in FIG. 4, the torque proportional variable gain calculation process M64 is a process of calculating the torque proportional variable gain Gp by using the current open loop gain Kor as an input instead of the value of the current proportional gain Kip. The torque proportional variable gain calculation process M64 is similar to the process when the value of the current proportional gain Kip is input.

The torque derivative variable gain calculation process M76 is a process of calculating the torque derivative variable gain Gd by using the current open loop gain Kor as an input instead of the value of the current proportional gain Kip. The torque derivative variable gain calculation process M76 is similar to the process when the value of the current proportional gain Kip is input.

Functions and Effects of Third Embodiment

The reaction force operation process M24 is configured to perform the feedforward control on the dq-axis currents Is. The feedback control on the dq-axis currents Is includes the process of calculating the operation signal MSs based on the current open loop output values Isor obtained by multiplying the current open loop gain Kor. The target reaction force calculation process M22 includes the torque proportional variable gain calculation process M64 and the torque derivative variable gain calculation process M76 for calculating the gains Gp, Gd for changing the response characteristic of the feedback control on the steering torque Th by using the current open loop gain Kor as the input. The torque proportional variable gain calculation process M64 is a process of reducing the torque proportional variable gain Gp in response to the characteristic of the steering system 10 that the stability of the closed loop R1 decreases as the current open loop gain Kor increases. Therefore, it is possible to change the response characteristic so as to suppress a significant decrease in the stability of the feedback control on the steering torque Th in response to the change in the state of the reaction force plant Pr caused by the change in the current open loop gain Kor. The same applies to the torque derivative variable gain calculation process M76.

The embodiment described above has effects according to (1-2) and (1-3) of the first embodiment.

Fourth Embodiment

A fourth embodiment will be described below with reference to the drawings, focusing on the differences from the first embodiment. For convenience of description, the same configurations as those in the first embodiment are denoted by the same signs as those in the first embodiment, and description thereof will be omitted.

Figure 9:
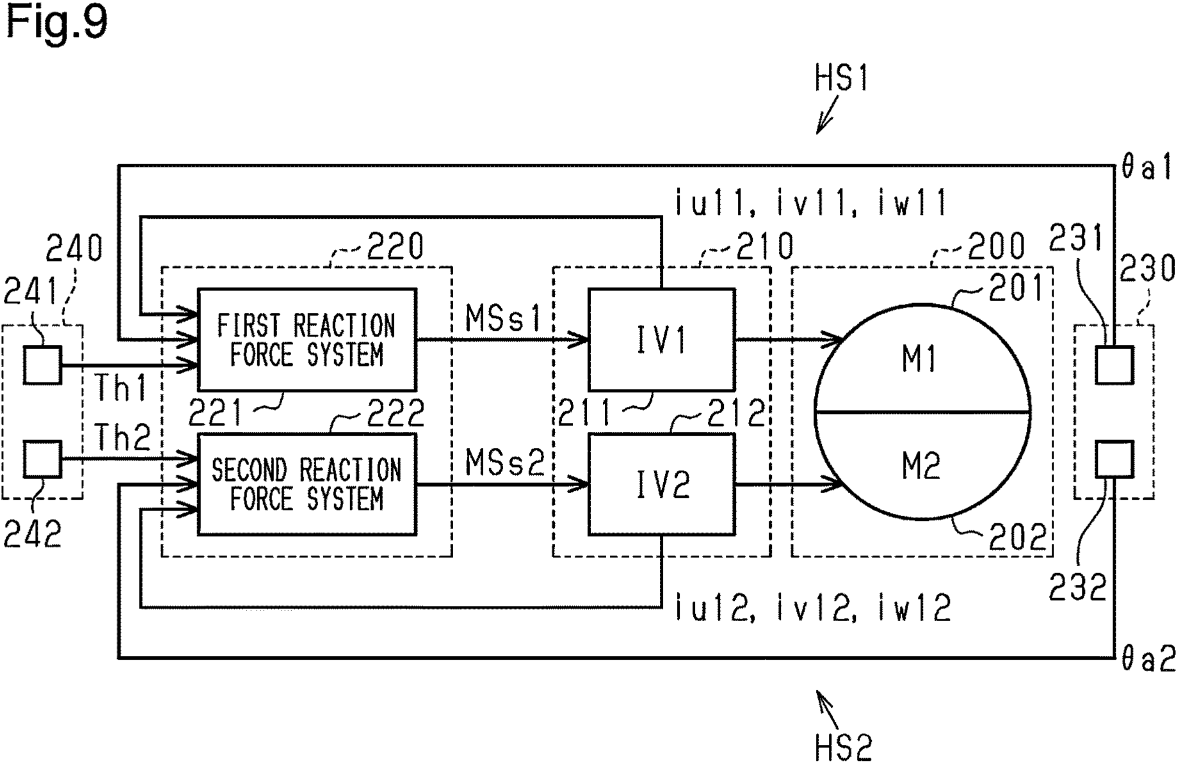
FIG. 9 is a diagram showing systems of a motor according to a fourth embodiment.

FIG. 9 shows details of the steering system 10 according to the present embodiment.

The steering system 10 includes winding groups of a plurality of systems constituting a reaction force motor 200. The steering system 10 also includes reaction force inverters of the plurality of systems constituting a reaction force inverter 210. The steering system 10 also includes a plurality of reaction force control systems constituting a reaction force control system 220. The steering system 10 also includes rotation angle sensors of the plurality of systems constituting a multi-system rotation angle sensor 230. The steering system 10 also includes torque sensors of the plurality of systems constituting a multi-system torque sensor 240.

For example, the reaction force motor 200 includes winding groups of two systems, namely a first winding group 201 and a second winding group 202. The multi-system reaction force inverter 210 includes winding groups of two systems, namely a first reaction force inverter 211 and a second reaction force inverter 212. The multi-system reaction force control system 220 includes a first reaction force control system 221 and a second reaction force control system 222. The multi-system rotation angle sensor 230 includes a first rotation angle sensor 231 and a second rotation angle sensor 232. The multi-system torque sensor 240 includes a first torque sensor 241 and a second torque sensor 242. The first winding group 201, the first reaction force inverter 211, the first reaction force control system 221, the first rotation angle sensor 231, and the first torque sensor 241 constitute a first reaction force system HS1 in cooperation. The second winding group 202, the second reaction force inverter 212, the second reaction force control system 222, the second rotation angle sensor 232, and the second torque sensor 242 constitute a second reaction force system HS2 in cooperation.

The first reaction force control system 221 and the second reaction force control system 222 have the same configuration and include various processes M10, M19, M22, and M24.

For example, the target reaction force calculation process M22 of the first reaction force control system 221 refers to a first steering torque Th1 detected by the first torque sensor 241. Therefore, the first reaction force control system 221 is a process of calculating a first target steering torque Th1* and also calculating a first target reaction force Ts1*. The reaction force operation process M24 of the first reaction force control system 221 refers to first currents iu11, iv11, and iw11 flowing through the first winding group 201. This process further refers to a first rotation angle θa1 of the rotating shaft of the reaction force motor 200 detected by the first rotation angle sensor 231. Therefore, the first reaction force control system 221 is a process of outputting a first operation signal MSs1 to the first reaction force inverter 211. Similarly, the second reaction force control system 222 refers to a second steering torque Th2 detected by the second torque sensor 242. Therefore, the second reaction force control system 222 is a process of calculating a second target steering torque Th2* and also calculating a second target reaction force Ts2*. The second reaction force control system 222 refers to second currents iu12, iv12, and iw12 flowing through the second winding group 202. The second reaction force control system 222 further refers to a second rotation angle θa2 of the rotating shaft of the reaction force motor 200 detected by the second rotation angle sensor 232. Therefore, the second reaction force control system 222 is a process of outputting a second operation signal MSs2 to the second reaction force inverter 212.

Figure 10:
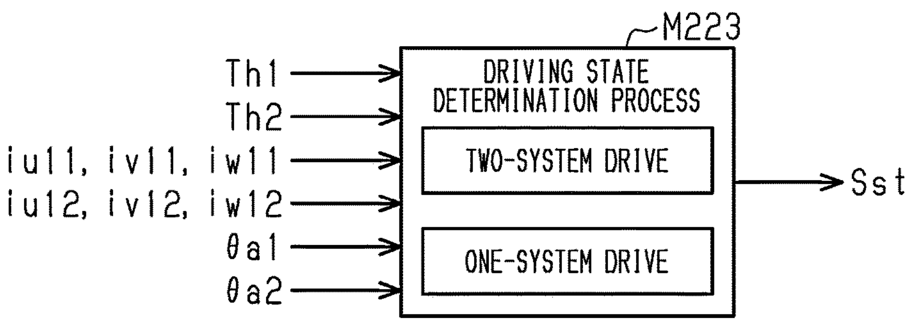
FIG. 10 is a block diagram showing details of a driving state determination process that is performed by a control device according to the fourth embodiment.

As shown in FIG. 10, the multi-system reaction force control system 220 includes a driving state determination process M223. The driving state determination process M223 is a process that takes the state variables obtained from the steering system 10 as an input and outputs a driving state signal Sst. In the driving state determination process M223, the driving state signal Sst is calculated as information indicating a power supply mode for the reaction force motor 200, that is, the first winding group 201 and the second winding group 202. For example, the power supply modes for the first winding group 201 and the second winding group 202 include two-system drive and one-system drive. The two-system drive is a power supply mode in which both the first reaction force control system 221 and the second reaction force control system 222 operate and electric power is supplied to both the first winding group 201 and the second winding group 202. The one-system drive is a power supply mode in which only either of the first reaction force control system 221 and the second reaction force control system 222 operates and electric power is supplied to only either of the first winding group 201 and the second winding group 202.

More specifically, in the case of two-system drive, the driving state signal Sst is calculated as "1." In the case of one-system drive, the driving state signal Sst is calculated as "0 (zero)." The power supply modes for the first winding group 201 and the second winding group 202 include conditions based on the state variables. The state variables include, for example, the voltage VB of the battery 24, the first currents iu11, iv11, and iw11, the second currents iu12, iv12, and iw12, the first rotation angle θa1, the second rotation angle θa2, the first steering torque Th1, and the second steering torque Th2. The conditions based on the state variables include a condition based on the results of comparison of the state variables with threshold values, and a condition based on the result of comparison of the plurality of state variables. These conditions are set from the viewpoint of whether the normal state can be maintained when the two-system drive is set as the normal state and the one-system drive is set as the backup state.

When the conditions based on the state variables indicate that the normal state can be maintained, the driving state signal Sst is set to "1" and the set driving state signal Sst of "1" is output in the driving state determination process M223. Therefore, the multi-system reaction force control system 220 performs control in the two-system drive. When the conditions based on the state variables indicate that the normal state cannot be maintained, the driving state signal Sst is set to "0" and the set driving state signal Sst of "0" is output in the driving state determination process M223. Therefore, the multi-system reaction force control system 220 performs control in the one-system drive.

Figure 11:
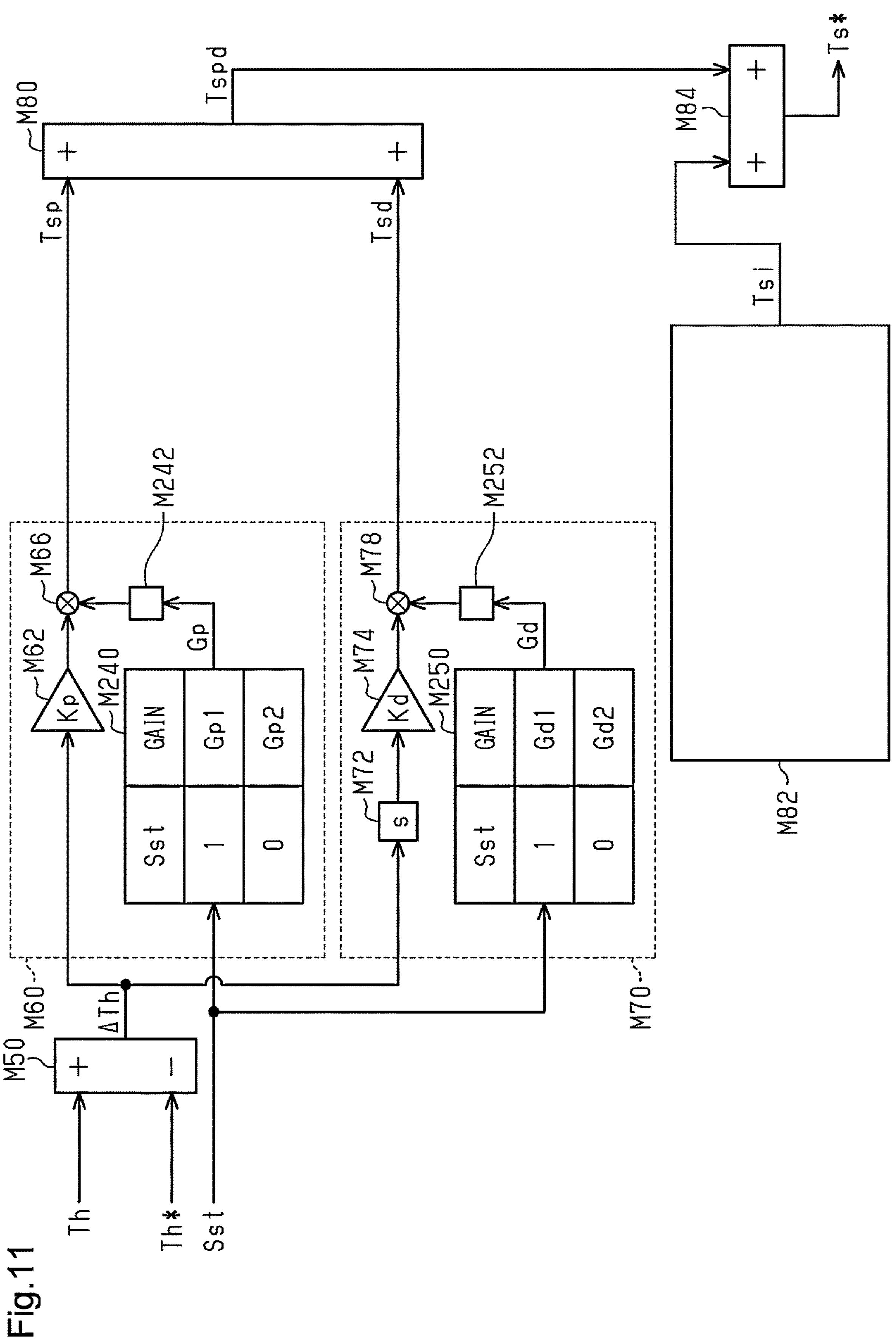
FIG. 11 is a block diagram showing details of a target reaction force calculation process that is performed by the control device according to the fourth embodiment.

FIG. 11 shows details of the target reaction force calculation process M22 according to the present embodiment. The first reaction force control system 221 and the second reaction force control system 222 include the same target reaction force calculation process M22. Only the first reaction force control system 221 will be described, and the description of the second reaction force control system 222 will be omitted.

The torque proportional element M60 includes a torque proportional variable gain calculation process M240. The torque proportional variable gain calculation process M240 is a process of calculating the torque proportional variable gain Gp by using the value of the driving state signal Sst as an input. The torque proportional variable gain calculation process M240 is, for example, a process in which the torque proportional variable gain Gp of "Gp1" when the value of the driving state signal Sst is "1" is equal to or greater than the torque proportional variable gain Gp of "GP2" when the value of the driving state signal Sst is "0." The value of the torque proportional variable gain Gp differs between the case where the value of the driving state signal Sst is "1" and the case where the value of the driving state signal Sst is "0." This process may be, for example, a process in which the PU 72 calculates the torque proportional variable gain Gp using table data stored in advance in the storage device 74. The table data is data whose input variable is the value of the driving state signal Sst and whose output variable is the value of the torque proportional variable gain Gp. In the present embodiment, the torque proportional variable gain calculation process M240 is an example of the characteristic change process. The table data is a data set of the input variables and the output variables corresponding to the input variables.

The output value of the torque proportional variable gain calculation process M240 is input to a gradual change process M242. The gradual change process M242 is a process of reducing the rate of change in the output variable relative to the change in the input variable. The gradual change process M242 may be, for example, a first-order lag filtering process. The output value of the gradual change process M242 is input to the torque proportional variable gain multiplication process M66.

The torque derivative element M70 includes a torque derivative variable gain calculation process M250. The torque derivative variable gain calculation process M250 is a process of calculating the torque derivative variable gain Gd by using the value of the driving state signal Sst as an input. The torque derivative variable gain calculation process M250 is, for example, a process in which the torque derivative variable gain Gd of "Gd1" when the value of the driving state signal Sst is "1" is equal to or greater than the torque derivative variable gain Gd of "Gd2" when the value of the driving state signal Sst is "0." The value of the torque derivative variable gain Gd differs between the case where the value of the driving state signal Sst is "1" and the case where the value of the driving state signal Sst is "0." This process may be, for example, a process in which the PU 72 calculates the torque derivative variable gain Gd using table data stored in advance in the storage device 74. The table data is data whose input variable is the value of the driving state signal Sst and whose output variable is the value of the torque derivative variable gain Gd. In the present embodiment, the torque derivative variable gain calculation process M250 is an example of the characteristic change process.

The output value of the torque derivative variable gain calculation process M250 is input to a gradual change process M252. The gradual change process M252 is a process of reducing the rate of change in the output variable relative to the change in the input variable. The gradual change process M252 may be, for example, a first-order lag filtering process. The output value of the gradual change process M252 is input to the torque derivative variable gain multiplication process M78.

Functions and Effects of Fourth Embodiment

The multi-system reaction force control system 220 includes the process of operating the multi-system reaction force inverter 210 so as to supply electric power to the first winding group 201 and the second winding group 202. The power supply modes for the first winding group 201 and the second winding group 202 include the two-system drive and the one-system drive. The target reaction force calculation process M22 includes the torque proportional variable gain calculation process M240 and the torque derivative variable gain calculation process M250 for changing the response characteristic of the feedback control on the steering torque Th by using the driving state signal Sst as the input. The same applies to both the first reaction force control system 221 and the second reaction force control system 222. The torque proportional variable gain calculation process M240 is a process of reducing the torque proportional variable gain Gp in response to the characteristic of the steering system 10 that the stability of the closed loop R1 decreases during the one-system drive. Therefore, it is possible to change the response characteristic so as to suppress a significant decrease in the stability of the feedback control on the steering torque Th in response to the change in the state of the reaction force plant Pr caused by the change in the power supply mode for the first winding group 201 and the second winding group 202. The same applies to the torque derivative variable gain calculation process M250.

The embodiment described above further has the following functions and effects in addition to effects according to (1-2) and (1-3) of the first embodiment.

(4-1) The target reaction force calculation process M22 includes the gradual change processes M242, M252. Therefore, in the target reaction force calculation process M22, the gain of the torque proportional element M60 is set according to the value obtained by gradually changing the value of the torque proportional variable gain Gp by the gradual change process M242. This makes it possible to suppress an abrupt change in the gain. The same applies to the value of the torque derivative variable gain Gd, that is, the gain of the torque derivative element M70.

Fifth Embodiment

A fifth embodiment will be described below with reference to the drawings, focusing on the differences from the fourth embodiment. For convenience of description, the same configurations as those in the fourth embodiment are denoted by the same signs as those in the fourth embodiment, and description thereof will be omitted.

Figure 12:
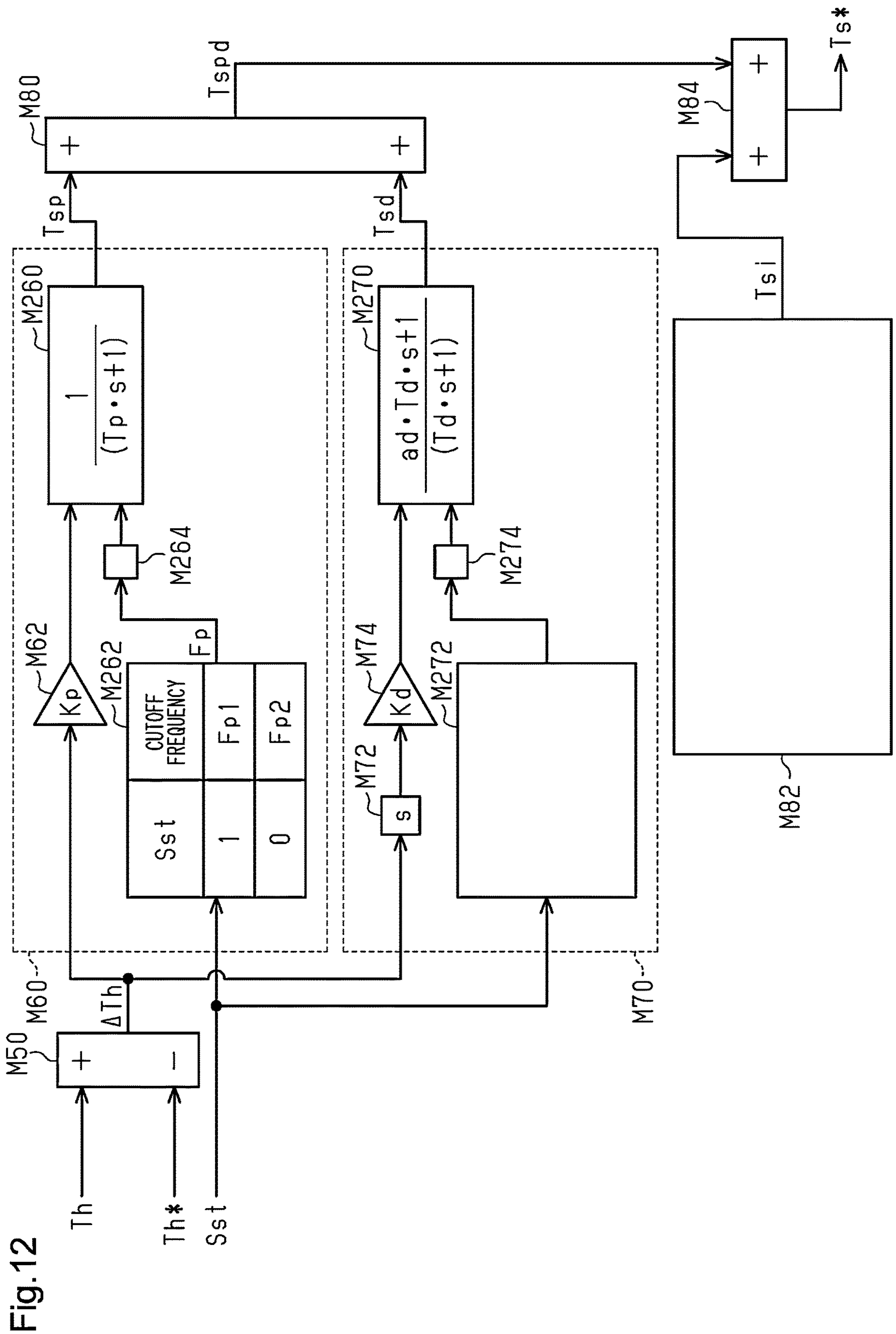
FIG. 12 is a block diagram showing details of a target reaction force calculation process that is performed by a control device according to a fifth embodiment.

FIG. 12 shows details of the target reaction force calculation process M22 according to the present embodiment. The first reaction force control system 221 and the second reaction force control system 222 include the same target reaction force calculation process M22. Only the first reaction force control system 221 will be described, and the description of the second reaction force control system 222 will be omitted.

The torque proportional element M60 includes a proportional phase controller M260 and a proportional characteristic variable process M262. The proportional phase controller M260 performs a low-pass filtering process for reducing a high-frequency component of the output value of the torque proportional gain multiplication process M62. More specifically, the proportional phase controller M260 is a first-order lag filter shown below.

$$1/(Tp \cdot s + 1)$$

where "Tp" is a time constant, and "s" is a linear operator indicating a first-order time derivative. The output value of the proportional phase controller M260 is the output value of the torque proportional element M60.

The proportional characteristic variable process M262 is a process of changing the characteristic of the proportional phase controller M260 according to the value of the driving state signal Sst. More specifically, the proportional characteristic variable process M262 changes a cutoff frequency Fp of the proportional phase controller M260 according to the value of the driving state signal Sst. In this process, the cutoff frequency Fp is set, for example, such that the cutoff frequency Fp of "Fp1" when the value of the driving state signal Sst is "1" is equal to or greater than the cutoff frequency Fp of "Fp2" when the value of the driving state signal Sst is "0." The value of the cutoff frequency Fp differs between the case where the value of the driving state signal Sst is "1" and the case where the value of the driving state signal Sst is "0." This process may be, for example, a process in which the PU 72 calculates the time constant Tp using table data stored in advance in the storage device 74. The table data is data whose input variable is the value of the driving state signal Sst and whose output variable is the value of the time constant Tp.

The output value of the proportional characteristic variable process M262 is input to a gradual change process M264. The gradual change process M264 is a process of reducing the rate of change in the output variable relative to the change in the input variable. The gradual change process M264 may be, for example, a first-order lag filtering process. The output value of the gradual change process M264 is input to the proportional phase controller M260.

The torque derivative element M70 includes a derivative phase controller M270 and a derivative characteristic variable process M272. The derivative phase controller M270 is a phase compensation filtering process for advancing or retarding the phase of a predetermined frequency component of the output value of the torque derivative gain multiplication process M74. The derivative phase controller M270 is a phase controller with a degree difference of zero as shown below.

$$\{ad \cdot Td \cdot s+1\}/(Td \cdot s+1)$$

where "Td" is a time constant. When "ad>1," the phase of the predetermined frequency component can be advanced.

The derivative characteristic variable process M272 is a process of changing the phase compensation characteristic of the derivative phase controller M270 according to the value of the driving state signal Sst. More specifically, the derivative characteristic variable process M272 changes the above predetermined frequency component according to the value of the driving state signal Sst. This process may be, for example, a process in which the PU 72 calculates the time constant Td or the variable ad using table data stored in advance in the storage device 74. The table data is data whose input variable is the value of the driving state signal Sst and whose output variable is the value of the time constant Td or the variable ad.

The output value of the derivative characteristic variable process M272 is input to a gradual change process M274. The gradual change process M274 is a process of reducing the rate of change in the output variable relative to the change in the input variable. The gradual change process M274 may be, for example, a first-order lag filtering process. The output value of the gradual change process M274 is input to the derivative phase controller M270.

Functions and Effects of Fifth Embodiment

The target reaction force calculation process M22 includes the proportional phase controller M260 and the derivative phase controller M270. The power supply modes for the first winding group 201 and the second winding group 202 include the two-system drive and the one-system drive. The target reaction force calculation process M22 includes the proportional characteristic variable process M262 and the derivative characteristic variable process M272 for variably setting the frequency characteristic of the torque proportional element M60 and the frequency characteristic of the torque derivative element M70 by using the driving state signal Sst as the input. The same applies to both the first reaction force control system 221 and the second reaction force control system 222. Therefore, it is possible to change the response characteristic so as to suppress a decrease in the stability of the feedback control on the steering torque Th in response to the change in the state of the reaction force plant Pr caused by the change in the power supply mode for the first winding group 201 and the second winding group 202.

The embodiment described above further has the following functions and effects in addition to effects according to (1-2) and (1-3) of the first embodiment and (4-1) of the fourth embodiment.

(5-1) The proportional characteristic variable process M262 is a process of increasing the cutoff frequency Fp in response to the characteristic that the stability of the closed loop R1 decreases in the case of one-system drive. Therefore, it is possible to change the response characteristic so as to suppress a significant decrease in the stability of the feedback control on the steering torque Th by reducing the responsiveness of the torque proportional element M60 in the steering system 10 in which control is unstable in the case of one-system drive.

(5-2) The derivative characteristic variable process M272 is a process of variably setting the characteristic of the derivative phase controller M270 depending on whether the drive is the two-system drive or the one-system drive. Therefore, the frequency characteristic of the torque derivative element M70 can be set to an appropriate characteristic according to the frequency characteristic of the torque proportional element M60.

Sixth Embodiment

A sixth embodiment will be described below with reference to the drawings, focusing on the differences from the first embodiment. For convenience of description, the same configurations as those in the first embodiment are denoted by the same signs as those in the first embodiment, and description thereof will be omitted.

Figure 13:
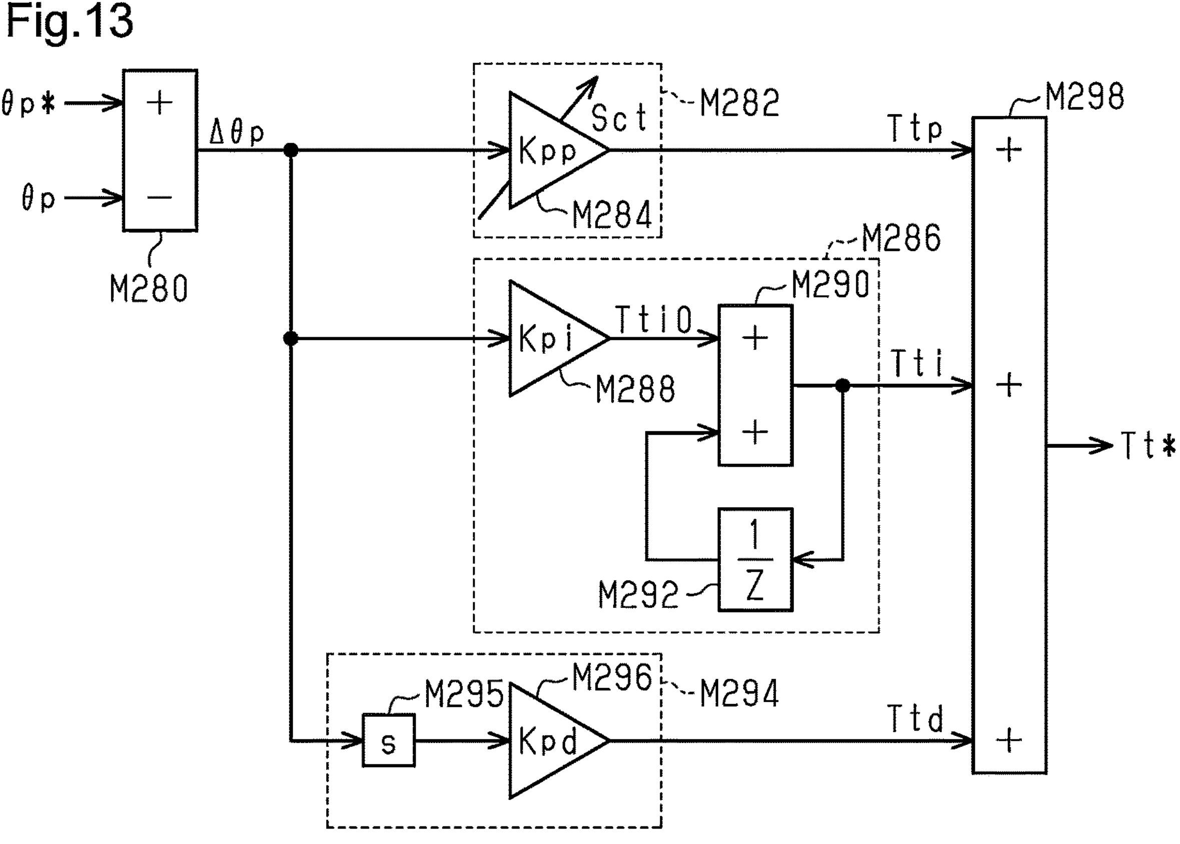
FIG. 13 is a block diagram showing details of a pinion angle feedback process that is performed by a control device according to a sixth embodiment.

FIG. 13 shows details of the pinion angle feedback process M16 according to the present embodiment.

A pinion angle deviation calculation process M280 is a process of calculating a pinion angle deviation Δθp that is a value obtained by subtracting the pinion angle θp from the target pinion angle θp*.

A pinion angle proportional element M282 is a process that takes the pinion angle deviation Δθp as an input and outputs a pinion angle proportional output value Ttp that is a value proportional to the pinion angle deviation Δθp. More specifically, a pinion angle proportional gain multiplication process M284 is a process of multiplying the pinion angle deviation Δθp by a pinion angle proportional gain Kpp. The pinion angle proportional gain Kpp is a value that changes based on a state variable Sct. For example, the state variable Sct is the result of identifying the state of the vehicle or the steering system 10. The state of the vehicle is, for example, the magnitude of the vehicle speed V. The state of the steering system 10 is, for example, at least one of the heat generation state of the steering motor 60, the magnitudes of the dq-axis currents It, the state of the voltage VB of the battery 24, the magnitude of the pinion angle θp, and the magnitude of a derivative of the pinion angle θp. In the pinion angle feedback process M16, the state variable Sct may be calculated based on related information, or may be input from another process for calculating the state variable Sct based on a related state.

The pinion angle proportional gain multiplication process M284 is a process in which, for example, when the state variable Sct refers to the vehicle speed V, the pinion angle proportional gain Kpp when the value of the state variable Sct is large is equal to or greater than the pinion angle proportional gain Kpp when the value of the state variable Sct is small. This process may be, for example, a process in which the PU 72 calculates the pinion angle proportional gain Kpp through a map calculation using map data stored in advance in the storage device 74. The map data is data whose input variable is the state variable Sct and whose output variable is the value of the pinion angle proportional gain Kpp.

A pinion angle integral element M286 is a process that takes the pinion angle deviation Δθp as an input and outputs a pinion angle integral output value Tti that is a value obtained by integrating the pinion angle deviation Δθp. More specifically, a pinion angle integral gain multiplication process M288 is a process of outputting a base value Tti0 that is a value obtained by multiplying the pinion angle deviation Δθp by a pinion angle integral gain Kpi. The pinion angle integral gain Kpi is, for example, a fixed value other than 0 (zero). The pinion angle integral gain Kpi may be a value that changes based on the state variable Sct similarly to the pinion angle proportional gain Kpp. An integration process M290 is a process of adding together the base value Tti0 and a previous value of the pinion angle integral output value Tti and outputting the sum as the pinion angle integral output value Tti. The previous value of the pinion angle integral output value Tti is a value held during the process in a previous cycle through a previous value holding process M292.

A pinion angle derivative element M294 is a process that takes the pinion angle deviation Δθp as an input and outputs a pinion angle derivative output value Ttd that is a value proportional to the first-order time derivative of the pinion angle deviation Δθp. More specifically, a linear operator M295 is a process of calculating the first-order time derivative of the pinion angle deviation Δθp. A pinion angle derivative gain multiplication process M296 is a process of multiplying the output value of the linear operator M295 by a pinion angle derivative gain Kpd. The pinion angle derivative gain Kpd is, for example, a fixed value other than 0 (zero). The pinion angle derivative gain Kpd may be a value that changes based on the state variable Sct similarly to the pinion angle proportional gain Kpp. In the present embodiment, the pinion angle proportional gain Kpp, the pinion angle integral gain Kpi, and the pinion angle derivative gain Kpd are examples of a steering control gain.

An addition process M298 is a process of outputting, as the steering torque command value Tt*, a value obtained by adding together the output value of the pinion angle proportional element M282, the output value of the pinion angle integral element M286, and the output value of the pinion angle derivative element M294.

As shown in FIG. 4, the torque proportional variable gain calculation process M64 is a process of calculating the torque proportional variable gain Gp by using the pinion angle proportional gain Kpp as an input instead of the value of the current proportional gain Kip. The torque proportional variable gain calculation process M64 is similar to the process when the value of the current proportional gain Kip is input.

The torque derivative variable gain calculation process M76 is a process of calculating the torque derivative variable gain Gd by using the pinion angle proportional gain Kpp as an input instead of the value of the current proportional gain Kip. The torque derivative variable gain calculation process M76 is similar to the process when the value of the current proportional gain Kip is input.

Functions and Effects of Sixth Embodiment

For example, as shown in FIG. 5, the steering system 10 is designed to reduce the effect of the feedback control on the steering torque Th on the stability of the closed loop R3. The state of the steering plant Pt that causes the change in the stability of the closed loop R3 changes depending on the state of the vehicle or the steering system 10. This causes a change in the state variable Sct and a change in the pinion angle proportional gain Kpp in the pinion angle feedback process M16. Such a change in the pinion angle proportional gain Kpp changes the level of the stability of the feedback control on the steering torque Th in the reaction force controller Cr.

Therefore, when the state of the steering plant Pt changes, the PU 72 performs the torque proportional variable gain calculation process M64 and the torque derivative variable gain calculation process M76 that change the response characteristic of the feedback control in order to suppress a decrease in the stability of the feedback control on the steering torque Th.

The torque proportional variable gain calculation process M64 is a process of reducing the torque proportional variable gain Gp in response to the characteristic of the steering system 10 that the stability of the closed loop R3 decreases as the pinion angle proportional gain Kpp increases. Therefore, it is possible to change the response characteristic so as to suppress a significant decrease in the stability of the feedback control on the steering torque Th in response to the change in the state of the steering plant Pt caused by the change in the pinion angle proportional gain Kpp. The same applies to the torque derivative variable gain calculation process M76.

The embodiment described above has effects according to (1-2) and (1-3) of the first embodiment.

Seventh Embodiment

A seventh embodiment will be described below with reference to the drawings, focusing on the differences from the first embodiment. For convenience of description, the same configurations as those in the first embodiment are denoted by the same signs as those in the first embodiment, and description thereof will be omitted.

Figure 14:
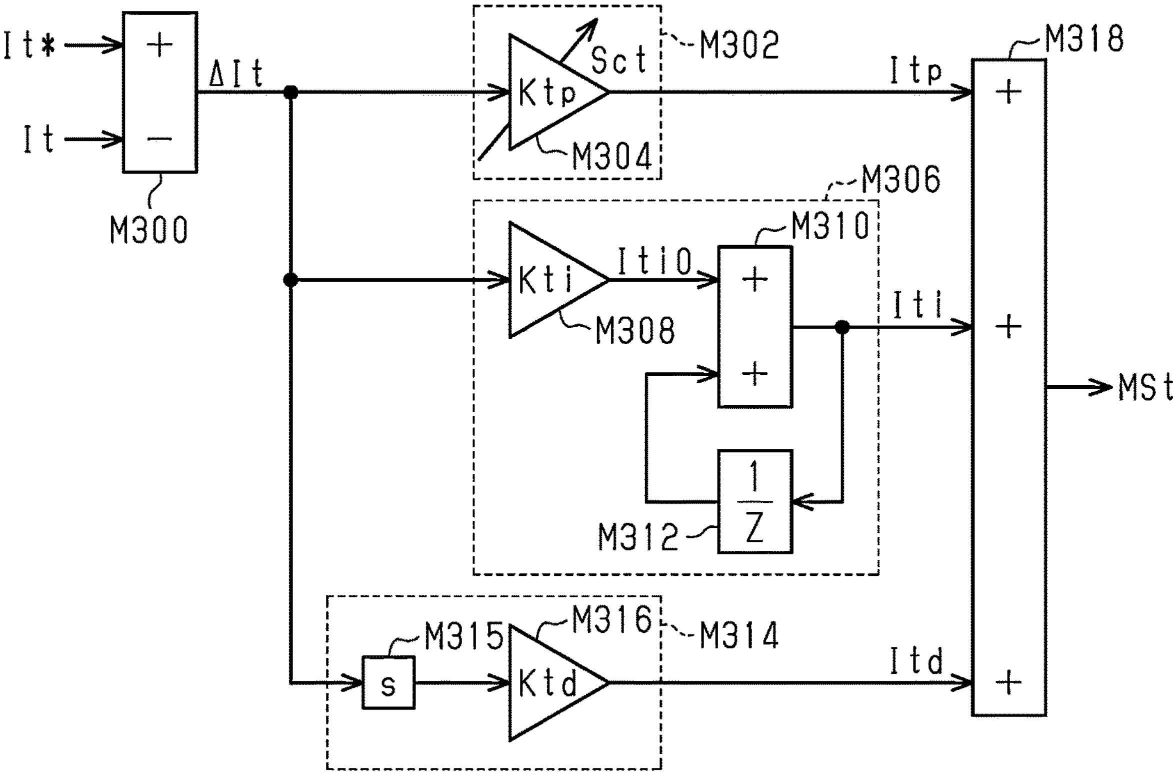
FIG. 14 is a block diagram showing details of a steering operation process that is performed by a control device according to a seventh embodiment.

FIG. 14 shows details of the steering operation process M18 according to the present embodiment. A steering current deviation calculation process M300 is a process of calculating a steering current deviation ΔIt that is a value obtained by subtracting the dq-axis currents It from the dq-axis current command values It*.

A steering current proportional element M302 is a process that takes the steering current deviation ΔIt as an input and outputs a steering current proportional output value Itp that is a value proportional to the steering current deviation ΔIt. More specifically, a steering current proportional gain multiplication process M304 is a process of multiplying the steering current deviation ΔIt by a steering current proportional gain Ktp. The steering current proportional gain Ktp is a value that changes based on the state variable Sct. In the steering operation process M18, the state variable Sct may be calculated based on related information, or may be input from another process for calculating the state variable Sct based on a related state.

The steering current proportional gain multiplication process M304 is a process in which, for example, when the state variable Sct refers to the vehicle speed V, the steering current proportional gain Ktp when the value of the state variable Sct is large is equal to or greater than the steering current proportional gain Ktp when the value of the state variable Sct is small. This process may be, for example, a process in which the PU 72 calculates the steering current proportional gain Ktp through a map calculation using map data stored in advance in the storage device 74. The map data is data whose input variable is the state variable Sct and whose output variable is the value of the steering current proportional gain Ktp.

A steering current integral element M306 is a process that takes the steering current deviation ΔIt as an input and outputs a steering current integral output value Iti that is a value obtained by integrating the steering current deviation ΔIt. More specifically, a steering current integral gain multiplication process M308 is a process of outputting a base value Iti0 that is a value obtained by multiplying the steering current deviation ΔIt by a steering current integral gain Kti. The steering current integral gain Kti is, for example, a fixed value other than 0 (zero). The steering current integral gain Kti may be a value that changes based on the state variable Sct similarly to the steering current proportional gain Ktp. An integration process M310 is a process of adding together the base value Iti0 and a previous value of the steering current integral output value Iti and outputting the sum as the steering current integral output value Iti. The previous value of the steering current integral output value Iti is a value held during the process in a previous cycle through a previous value holding process M312.

A steering current derivative element M314 is a process that takes the steering current deviation ΔIt as an input and outputs a steering current derivative output value Itd that is a value proportional to the first-order time derivative of the steering current deviation ΔIt. More specifically, a linear operator M315 is a process of calculating the first-order time derivative of the steering current deviation ΔIt. A steering current derivative gain multiplication process M316 is a process of multiplying an output value of the linear operator M315 by a steering current derivative gain Ktd. The steering current derivative gain Ktd is, for example, a fixed value other than 0 (zero). The steering current derivative gain Ktd may be a value that changes based on the state variable Sct similarly to the steering current proportional gain Ktp. In the present embodiment, the steering current proportional gain Ktp, the steering current integral gain Kti, and the steering current derivative gain Ktd are examples of a steering current control gain.

An addition process M318 is a process of outputting, as the operation signal MSt, a value obtained by adding together the output value of the steering current proportional element M302, the output value of the steering current integral element M306, and the output value of the steering current derivative element M314.

As shown in FIG. 4, the torque proportional variable gain calculation process M64 is a process of calculating the torque proportional variable gain Gp by using the steering current proportional gain Ktp as an input instead of the value of the current proportional gain Kip. The torque proportional variable gain calculation process M64 is similar to the process when the value of the current proportional gain Kip is input.

The torque derivative variable gain calculation process M76 is a process of calculating the torque derivative variable gain Gd by using the steering current proportional gain Ktp as an input instead of the value of the current proportional gain Kip. The torque derivative variable gain calculation process M76 is similar to the process when the value of the current proportional gain Kip is input.

Functions and Effects of Seventh Embodiment

For example, as shown in FIG. 5, the steering system 10 is designed to reduce the effect of the feedback control on the steering torque Th on the stability of the closed loop R3. The state of the steering plant Pt that causes the change in the stability of the closed loop R3 changes depending on the state of the vehicle or the steering system 10. This causes a change in the state variable Sct and a change in the steering current proportional gain Ktp in the steering operation process M18. Such a change in the steering current proportional gain Ktp changes the level of the stability of the feedback control on the steering torque Th in the reaction force controller Cr.

Therefore, when the state of the steering plant Pt changes, the PU 72 performs the torque proportional variable gain calculation process M64 and the torque derivative variable gain calculation process M76 that change the response characteristic of the feedback control in order to suppress a decrease in the stability of the feedback control on the steering torque Th.

The torque proportional variable gain calculation process M64 is a process of reducing the torque proportional variable gain Gp in response to the characteristic of the steering system 10 that the stability of the closed loop R3 decreases as the steering current proportional gain Ktp increases. Therefore, it is possible to change the response characteristic so as to suppress a significant decrease in the stability of the feedback control on the steering torque Th in response to the change in the state of the steering plant Pt caused by the change in the steering current proportional gain Ktp. The same applies to the torque derivative variable gain calculation process M77.

The embodiment described above has effects according to (1-2) and (1-3) of the first embodiment.

Other Embodiments

Each of the above embodiments can be modified as follows. The above embodiments and the following other embodiments can be combined unless technical contradictions arise.

- In the first embodiment, in the torque proportional variable gain calculation process M64, the torque proportional variable gain Gp may be calculated by using the current integral gain Kii or the current derivative gain Kid as an input instead of the value of the current proportional gain Kip. The current integral gain Kii or the current derivative gain Kid input to the torque proportional variable gain calculation process M64 may be a value that changes based on the state variable Sc similarly to the current proportional gain Kip. The same applies to the torque derivative variable gain calculation process M76.
- In the first embodiment, the torque proportional variable gain calculation process M64 may be, for example, a process in which the torque proportional variable gain Gp when the value of the current proportional gain Kip is large is equal to or greater than the torque proportional variable gain Gp when the value of the current proportional gain Kip is small. In this case, the torque proportional variable gain calculation process M64 reduces the torque proportional variable gain Gp in response to the characteristic of the steering system 10 that the stability of the closed loop R1 decreases as the current proportional gain Kip decreases. The same applies to the torque proportional variable gain calculation process M64. The torque proportional variable gain Gp and the torque derivative variable gain Gd need not have the same tendency in response to the change in the value of the current proportional gain Kip, and may have, for example, opposite tendencies. The other embodiment described herein can be similarly applied to the torque proportional variable gain calculation process M64 and the torque derivative variable gain calculation process M76 in the third, sixth, and seventh embodiments.
- In the first embodiment, the torque proportional variable gain multiplication process M66 may be provided upstream of the torque proportional gain multiplication process M62. In other words, the torque deviation ΔTh may be multiplied by the torque proportional variable gain Gp. The torque derivative variable gain multiplication process M78 may be provided upstream of the torque derivative gain multiplication process M74. In other words, the first-order time derivative of the torque deviation ΔTh may be multiplied by the torque derivative variable gain Gd. The other embodiment described herein can be similarly applied to the torque proportional variable gain multiplication process M66 and the torque derivative variable gain multiplication process M78 in the third, sixth, and seventh embodiments. The other embodiment described herein can be similarly applied to the torque proportional variable gain multiplication process M67 and the torque derivative variable gain multiplication process M79 in the second embodiment.

In the first embodiment, the reaction force operation process M24 need not necessarily include the current integral element M36 or the current derivative element M44.

In the first embodiment, the target reaction force calculation process M22 need not necessarily include the torque derivative element M70 or the second manipulated variable calculation process M82. The other embodiment described herein can be similarly applied to the second to seventh embodiments.

In the first embodiment, the output value of the torque derivative element M70 may be subtracted from the output value of the torque proportional element M60. In this case, the PD manipulated variable Tspd is a manipulated variable of derivative leading PD control. The other embodiment described herein can be similarly applied to the second to seventh embodiments.

In the first embodiment, the target reaction force calculation process M22 may be configured not to include either the torque proportional variable gain calculation process M64 or the torque derivative variable gain calculation process M76. The other embodiment described herein can be similarly applied to the torque proportional variable gain calculation process M64 and the torque derivative variable gain calculation process M76 in the third, sixth, and seventh embodiments. The other embodiment described herein can be similarly applied to the torque proportional variable gain multiplication process M67 and the torque derivative variable gain multiplication process M79 in the second embodiment.

In the first embodiment, the control on the steered angle need not necessarily include the process of calculating the manipulated variable for controlling the controlled variable indicating the steered angle such as the pinion angle θp by feedback control. For example, the control on the steered angle may include a process of calculating a manipulated variable for controlling the controlled variable indicating the steered angle to a target value by open-loop control. Alternatively, for example, the control on the steered angle may include a process of calculating the sum of the manipulated variable for the open-loop control and the manipulated variable for the feedback control. The other embodiment described herein can be similarly applied to the second to fifth embodiments.

In the first embodiment, the method for controlling the steering motor 60 is not limited to the feedback process for the dq-axis currents It. For example, in the case where a direct current motor is used as the steering motor 60 and an H-bridge circuit is used as the drive circuit, a current that flows through the steering motor 60 may be controlled. The other embodiment described herein can be similarly applied to the second to fifth embodiments.

In the second embodiment, the torque proportional element M60 may additionally include a process of calculating a torque proportional variable gain Gpd by using the current derivative gain Kid as an input. This process may be similar to the torque proportional variable gain calculation processes M64, M65. The current derivative gain Kid may be a value that changes based on the state variable Sc similarly to the current proportional gain Kip. The torque proportional element M60 may additionally include a process corresponding to the torque proportional variable gain calculation process M240 of the fourth embodiment. The torque proportional element M60 may additionally include a process corresponding to the proportional phase controller M260 and the proportional characteristic variable process M262 of the fifth embodiment. The torque proportional element M60 may additionally include a process of calculating the torque proportional variable gain Gp by using, as an input, for example, the pinion angle proportional gain Kpp obtained in relation to the pinion angle feedback process M16 of the sixth embodiment. The torque proportional element M60 may additionally include a process of calculating the torque proportional variable gain Gp by using, as an input, for example, the steering current proportional gain Ktp obtained in relation to the steering operation process M18 of the seventh embodiment. The above additional processes can be added as substitutes for the torque proportional variable gain calculation process M65. The other embodiment described herein can be similarly applied to the torque derivative element M70.

In the second embodiment, the torque proportional variable gain calculation process M65 may be, for example, a process in which the torque proportional variable gain Gpi when the value of the current integral gain Kii is large is equal to or greater than the torque proportional variable gain Gpi when the value of the current integral gain Kii is small. In this case, the torque proportional variable gain calculation process M65 reduces the torque proportional variable gain Gpi in response to the characteristic of the steering system 10 that the stability of the closed loop R1 decreases as the current integral gain Kii decreases. The same applies to the torque derivative variable gain calculation process M77. The torque proportional variable gain Gpi and the torque derivative variable gain Gdi need not have the same tendency in response to the change in the value of the current integral gain Kii, and may have, for example, opposite tendencies.

In the second embodiment, the reaction force operation process M24 need not necessarily include the current derivative element M44.

In the fourth embodiment, the torque proportional variable gain Gp and the torque derivative variable gain Gd need not have the same tendency in response to the change in the value of the driving state signal Sst, and may have, for example, opposite tendencies.

In the fourth embodiment, the two-system drive may further include cooperative drive and independent drive. The cooperative drive is, for example, a state in which the first reaction force control system 221 and the second reaction force control system 222 operate in cooperation with each other. The independent drive is, for example, a state in which the first reaction force control system 221 and the second reaction force control system 222 operate independently of each other. The one-system drive may further include backup drive and special drive. The backup drive is, for example, a steady state of the one-system drive after switching from the two-system drive to the one-system drive. The special drive is, for example, an operating state in which the limit on the output of the reaction force motor 200 is temporarily stopped during a transitional state from the two-system drive to the one-system drive. In this case, in the driving state determination process M223, the driving state signal Sst may be calculated as information indicating which of the cooperative drive, the independent drive, the backup drive, and the special drive is being performed. In the torque proportional variable gain calculation process M240, the torque proportional variable gain Gp may be calculated by using the value of the driving state signal Sst as an input. The same applies to the torque derivative variable gain calculation process M250. Therefore, it is possible to change the response characteristic so as to suppress more suitably a significant decrease in the stability of the feedback control on the steering torque Th in response to the change in the state of the reaction force plant Pr caused by the change in the power supply mode for the first winding group 201 and the second winding group 202. The other embodiment described herein can be similarly applied to the fifth embodiment.

In the fourth embodiment, the state variable Sc may be a variable that is linked to the driving state signal Sst or substituted by the driving state signal Sst. In this case, the current proportional gain Kip changes depending on the driving state signal Sst. In the torque proportional variable gain calculation process M240, the torque proportional variable gain Gp can be calculated by using the current proportional gain Kip as an input instead of the value of the driving state signal Sst. When the current integral gain Kii or the current derivative gain Kid changes depending on the driving state signal Sst, the torque proportional variable gain calculation process M240 may take the current integral gain Kii or the current derivative gain Kid as the input instead. The same applies to the torque derivative variable gain calculation process M250. Thus, functions and effects similar to those of the fourth embodiment can be obtained. The other embodiment described herein can be similarly applied to the fifth embodiment.

In the fourth embodiment, the number of systems may be changed to three or more. In this case, the contents of the driving state signal Sst and the torque proportional variable gain Gp may be changed depending on the number of systems. The same applies to the contents of the torque derivative variable gain Gd. The winding group, the reaction force inverter, and the reaction force control system may differ from one another in terms of the number of systems. For example, in the fourth embodiment, there may be two systems, namely the first winding group 201 and the second winding group 202, but there may be one system for the reaction force inverter and reaction force control system. The other embodiment described herein can be similarly applied to the fifth embodiment.

In the fourth embodiment, the torque proportional element M60 need not necessarily include the gradual change process M242. In this case, for example, the PU 72 may calculate the torque proportional variable gain Gp through a map calculation using map data stored in advance in the storage device 74. The same applies to the torque derivative element M70. The other embodiment described herein can be similarly applied to the fifth embodiment.

In the fourth embodiment, the gradual change process M242 may be provided downstream of the torque proportional variable gain multiplication process M66. The same applies to the gradual change process M252.

In the fourth embodiment, the method for controlling the reaction force motor 200 is not limited to the feedback process for the dq-axis currents Is. For example, in the case where a direct current motor is used as the reaction force motor 200 and an H-bridge circuit is used as the drive circuit, a current that flows through the reaction force motor 200 may be controlled. The other embodiment described herein can be similarly applied to the fifth to seventh embodiments.

In the fourth embodiment, when the steering motor 60 has a configuration similar to that of the reaction force motor 200 etc., in the torque proportional variable gain calculation process M240, the torque proportional variable gain Gp may be calculated by using the value of the driving state signal related to the steering motor 60 as an input. The same applies to the torque derivative variable gain calculation process M250. The other embodiment described herein can be similarly applied to the fifth embodiment.

In the fifth embodiment, the proportional characteristic variable process M262 and the derivative characteristic variable process M272 need not have the same tendency in response to the change in the value of the driving state signal Sst, and may have, for example, opposite tendencies.

In the fifth embodiment, in the proportional characteristic variable process M262, the cutoff frequency Fp of the proportional phase controller M260 may be changed by using the current proportional gain Kip as an input instead of the value of the driving state signal Sst. In this case, the torque proportional element M60 may additionally include a process of changing the cutoff frequency Fp of the proportional phase controller M260 by using the current integral gain Kii as an input as in the second embodiment. This process may be similar to the proportional characteristic variable process M262. The torque proportional element M60 may further additionally include a process of changing the cutoff frequency Fp of the proportional phase controller M260 by using the current derivative gain Kid as an input. This process may be similar to the proportional characteristic variable process M262. The current integral gain Kii or the current derivative gain Kid may be a value that changes based on the state variable Sc similarly to the current proportional gain Kip. The same applies to the derivative characteristic variable process M272 and the torque derivative element M70.

In the fifth embodiment, the torque proportional element M60 may additionally include the torque proportional variable gain calculation process M64 and the torque proportional variable gain multiplication process M66 of the first embodiment. The torque proportional element M60 may additionally include the torque proportional variable gain calculation process M65 and the torque proportional variable gain multiplication process M67 of the second embodiment. The same applies to the torque derivative element M70. In the other embodiment described herein, the other embodiments related to the first embodiment and the second embodiment can be further combined.

In the fifth embodiment, the proportional phase controller M260 is not limited to the first-order lag element. For example, a second-order lag element may be used. Alternatively, a phase controller with a relative degree of zero as shown below may be used.

$$\alpha p \cdot (Tp2 \cdot s + 1)/(Tp1 \cdot s + 1)$$

where "αp<1."

The derivative phase controller M270 is not limited to that shown in the above embodiments.

In the fifth embodiment, the target reaction force calculation process M22 may be configured not to include either the proportional characteristic variable process M262 or the derivative characteristic variable process M272.

In the fifth embodiment, the target reaction force calculation process M22 may be configured not to include either the proportional phase controller M260 or the derivative phase controller M270. For example, the target reaction force calculation process M22 may include a controller that adjusts the phase of the output value of the addition process M80.

In the fifth embodiment, the gradual change process M264 may be provided downstream of the proportional phase controller M260. The same applies to the gradual change process M274.

In the sixth embodiment, in the torque proportional variable gain calculation process M64, the torque proportional variable gain Gp may be calculated by using the pinion angle integral gain Kpi or the pinion angle derivative gain Kpd as an input instead of the value of the pinion angle proportional gain Kpp. The pinion angle integral gain Kpi or the pinion angle derivative gain Kpd input to the torque proportional variable gain calculation process M64 may be a value that changes based on the state variable Sct similarly to the pinion angle proportional gain Kpp. The same applies to the torque derivative variable gain calculation process M76.

In the sixth embodiment, the pinion angle feedback process M16 need not necessarily include the pinion angle integral element M286 or the pinion angle derivative element M294.

In the seventh embodiment, in the torque proportional variable gain calculation process M64, the torque proportional variable gain Gp may be calculated by using the steering current integral gain Kti or the steering current derivative gain Ktd as an input instead of the value of the steering current proportional gain Ktp. The steering current integral gain Kti or the steering current derivative gain Ktd input to the torque proportional variable gain calculation process M64 may be a value that changes based on the state variable Sct similarly to the steering current proportional gain Ktp. The same applies to the torque derivative variable gain calculation process M76.

In the seventh embodiment, the steering operation process M18 need not necessarily include the steering current integral element M306 or the steering current derivative element M314.

In each of the above embodiments, the amount of displacement of the steering wheel 12 is not limited to the amount calculated based on the integration process for the rotation angle θa. For example, this may be a detected value of a steering angle sensor that directly detects the rotation angle of the steering shaft 14. The steering angle sensor may be provided, for example, on the steering shaft 14 between the steering wheel 12 and the torque sensor 80.

In each of the above embodiments, the manipulated variable for controlling the steering torque Th to the target steering torque Th* is not limited to the variable indicating the reaction force to be applied to the steering wheel 12. For example, in the case of a device in which power can be transmitted between the steering wheel 12 and the steered wheels 44 as described in the section "Regarding Steering System" below, the manipulated variable is a variable indicating torque that assists torque applied to the steering wheel 12 by the driver.

In each of the above embodiments, the base target torque calculation process M20 is not limited to the process that takes the vehicle speed V as an input in addition to the axial force Taf. It is not essential to calculate the base target torque Thb* by using the axial force Taf as an input. For example, the base target torque Thb* may be calculated by using the steering torque Th and the vehicle speed V as inputs. For example, this can be implemented by the PU 72 calculating the base target torque Thb* through a map calculation using map data stored in advance in the storage device 74. The map data is data whose inputs are the steering torque Th and the vehicle speed V and whose output variable is the base target torque Thb*.

In each of the above embodiments, a process of controlling a detected value of the amount of movement of the steered shaft 40 to a target value may be used instead of the pinion angle feedback process M16. In this case, the controlled variable for the pinion angle θp etc. in each of the above embodiments is replaced with a controlled variable for the amount of movement of the steered shaft 40 etc.

In each of the above embodiments, the operation member to be operated by the driver to steer the vehicle is not limited to the steering wheel 12. For example, the operation member may be a joystick.

In each of the above embodiments, the reaction force motor 20, 200 mechanically connected to the steering wheel 12 is not limited to the three-phase brushless motor. For example, the reaction force motor 20, 200 may be a brushed direct current motor.

In each of the above embodiments, the drive circuit for the reaction force motor 20, 200 mechanically connected to the operation member is not limited to the reaction force inverter 22, 210. For example, the drive circuit may be an H-bridge circuit.

In each of the above embodiments, the speed reduction mechanism 16 need not necessarily be provided.

In each of the above embodiments, the control device 70 is not limited to the control device that includes the PU 72 and the storage device 74 and that performs software processing. For example, the control device may include a dedicated hardware circuit such as an ASIC that performs at least part of the processes performed in each of the above embodiments. That is, the control device may include a processing circuit including any of the following configurations (a) to (c): (a) a processing circuit including a processing device that performs all of the above processes according to a program, and a program storage device such as a storage device that stores the program, (b) a processing circuit including a processing device that performs part of the above processes according to a program, a program storage device, and a dedicated hardware circuit that performs the remainder of the above processes, and (c) a processing circuit including a dedicated hardware circuit that performs all of the above processes. The number of software execution devices including a processing device and a program storage device may be two or more. The number of dedicated hardware circuits may be two or more.

In each of the above embodiments, for example, an actuator in which the steering motor 60 is disposed coaxially with the steered shaft 40 may be used as the steering actuator At. Alternatively, for example, an actuator connected to the steered shaft 40 via a belt speed reducer using a ball screw mechanism may be used as the steering actuator At.

In each of the above embodiments, the steering actuator At is not limited to the one configured so that the right steered wheel 44 and the left steered wheel 44 operate in conjunction with each other. In other words, the steering actuator At may be configured to control the right steered wheel 44 and the left steered wheel 44 independently of each other.

In each of the above embodiments, the steering device that can change the relationship between the steering angle and the steered angle is not limited to the steering device in which power transmission between the steering wheel 12 and the steered wheels 44 is disconnected. For example, the steering device may be configured to change the relationship between the steering angle and the steered angle by using a variable gear as a gear that allows power transmission between the steering wheel 12 and the steered wheels 44. The steering device is not limited to the steering device that can change the relationship between the steering angle and the steered angle. For example, the steering device may be a steering device in which the steering wheel 12 and the steered wheels 44 are mechanically connected.

The phrase "at least one" used herein means "one or more" of desired options. For example, when the number of options is two, the phrase "at least one" used herein means "only one option" or "both of the two options." As another example, when the number of options is three or more, the phrase "at least one" used herein means "only one option" or "any combination of two or more options."

The invention claimed is:

1. A steering control device configured to operate a motor mechanically connected to an operation member to be operated by a driver to steer a vehicle, and including winding groups of a plurality of systems, wherein the motor is a drive source for a plant mounted on the vehicle, the steering control device is configured to perform a torque feedback process, an operation process, and a characteristic change process, the torque feedback process includes a process of calculating a manipulated variable for controlling steering torque to target steering torque by feedback control, the steering torque is torque input to the operation member, the operation process is a process of operating a drive circuit for the motor to supply electric power to the winding groups of the plurality of systems based on the manipulated variable, and the characteristic change process includes a process of changing a response characteristic of the feedback control according to a power supply mode for the winding groups of the plurality of systems that is a plant state of the plant.

2. A steering control device configured to operate a motor mechanically connected to an operation member to be operated by a driver to steer a vehicle, wherein the motor is a drive source for a plant mounted on the vehicle, the steering control device is configured to perform a torque feedback process, an operation process, and a characteristic change process, the torque feedback process includes a process of calculating a manipulated variable for controlling steering torque to target steering torque by feedback control, the steering torque is torque input to the operation member, the operation process is a process of operating a drive circuit for the motor based on the manipulated variable, the process of calculating the manipulated variable includes:

a process of calculating a torque proportional output value of a proportional element; and a process of calculating the manipulated variable based on output values including the torque proportional output value, the torque proportional output value is a value obtained by multiplying a difference between the steering torque and the target steering torque by a torque proportional gain, and the characteristic change process includes a process of changing a response characteristic of the feedback control in the torque feedback process by changing the torque proportional gain according to a plant state of the plant.

3. A steering control device configured to operate a motor mechanically connected to an operation member to be operated by a driver to steer a vehicle, wherein the motor is a drive source for a plant mounted on the vehicle, the steering control device is configured to perform a torque feedback process, an operation process, and a characteristic change process, the torque feedback process includes a process of calculating a manipulated variable for controlling steering torque to target steering torque by feedback control, the steering torque is torque input to the operation member, the operation process is a process of operating a drive circuit for the motor based on the manipulated variable, the process of calculating the manipulated variable includes:

a process of calculating a torque derivative output value of a derivative element; and a process of calculating the manipulated variable based on output values including the torque derivative output value, the torque derivative output value is a value obtained by multiplying a first-order time derivative of a difference between the steering torque and the target steering torque by a torque derivative gain, and the characteristic change process includes a process of changing a response characteristic of the feedback control in the torque feedback process by changing the torque derivative gain according to a plant state of the plant.

4. The steering control device according to claim 1, wherein the operation process includes:

a current feedback process for calculating a current manipulated variable by feedback control so that an actual current flowing through the motor reaches a target current obtained based on the manipulated variable; and a process of operating the drive circuit based on the current manipulated variable, the current feedback process includes a process of calculating the current manipulated variable based on an output value obtained by multiplying a difference between the target current and the actual current by a current control gain, and the characteristic change process includes a process of changing the response characteristic by referring to the current control gain as the plant state and using the current control gain as an input.

5. The steering control device according to claim 2, wherein the operation process includes:

a current feedback process for calculating a current manipulated variable by feedback control so that an actual current flowing through the motor reaches a target current obtained based on the manipulated variable; and a process of operating the drive circuit based on the current manipulated variable, the current feedback process includes a process of calculating the current manipulated variable based on an output value obtained by multiplying a difference between the target current and the actual current by a current control gain, and the characteristic change process includes a process of changing the response characteristic by referring to the current control gain as the plant state and using the current control gain as an input.

6. The steering control device according to claim 3, wherein the operation process includes:

a current feedback process for calculating a current manipulated variable by feedback control so that an actual current flowing through the motor reaches a target current obtained based on the manipulated variable; and a process of operating the drive circuit based on the current manipulated variable, the current feedback process includes a process of calculating the current manipulated variable based on an output value obtained by multiplying a difference between the target current and the actual current by a current control gain, and the characteristic change process includes a process of changing the response characteristic by referring to the current control gain as the plant state and using the current control gain as an input.

7. The steering control device according to claim 4, wherein the output value includes a current proportional output value of a proportional element, the current proportional output value is a value obtained by multiplying the difference between the target current and the actual current by a current proportional gain, and the current control gain includes the current proportional gain.

8. The steering control device according to claim 4, wherein the output value includes a current integral output value of an integral element, the current integral output value is a value obtained by multiplying the difference between the target current and the actual current by a current integral gain and integrating a resultant, and the current control gain includes the current integral gain.

9. The steering control device according to claim 1, wherein the operation process includes:

a current open loop process for calculating a current manipulated variable by feedforward control so that an actual current flowing through the motor reaches a target current obtained based on the manipulated variable; and a process of operating the drive circuit based on the current manipulated variable, the current open loop process includes:

a process of calculating a current open loop output value; and a process of calculating the current manipulated variable based on output values including the current open loop output value, the current open loop output value is a value obtained by multiplying the target current by a current open loop gain, and the characteristic change process includes a process of changing the response characteristic by referring to the current open loop gain as the plant state and using the current open loop gain as an input.

10. The steering control device according to claim 2, wherein the operation process includes:

a current open loop process for calculating a current manipulated variable by feedforward control so that an actual current flowing through the motor reaches a target current obtained based on the manipulated variable; and a process of operating the drive circuit based on the current manipulated variable, the current open loop process includes:

a process of calculating a current open loop output value; and a process of calculating the current manipulated variable based on output values including the current open loop output value, the current open loop output value is a value obtained by multiplying the target current by a current open loop gain, and the characteristic change process includes a process of changing the response characteristic by referring to the current open loop gain as the plant state and using the current open loop gain as an input.

11. The steering control device according to claim 3, wherein the operation process includes:

a current open loop process for calculating a current manipulated variable by feedforward control so that an actual current flowing through the motor reaches a target current obtained based on the manipulated variable; and a process of operating the drive circuit based on the current manipulated variable, the current open loop process includes:

a process of calculating a current open loop output value; and a process of calculating the current manipulated variable based on output values including the current open loop output value, the current open loop output value is a value obtained by multiplying the target current by a current open loop gain, and the characteristic change process includes a process of changing the response characteristic by referring to the current open loop gain as the plant state and using the current open loop gain as an input.

12. The steering control device according to claim 1, wherein the motor is a reaction force motor configured to apply a steering reaction force to the operation member, the plant includes a reaction force actuator including the reaction force motor, and a steering actuator, the steering actuator includes a steering motor that is mechanically connected to a steered wheel of the vehicle and is configured to apply a steering force for steering the steered wheel, the torque feedback process, the operation process, and the characteristic change process are a reaction force process related to operation of a drive circuit for the reaction force motor, the steering control device is configured to perform a steering process including a steering feedback process and a steering operation process, the steering feedback process includes a process of calculating a steering manipulated variable for controlling a converted steered angle to a target steered angle by feedback control, the converted steered angle is information acquirable in the steering actuator, the steering operation process is a process of operating a drive circuit for the steering motor based on the steering manipulated variable, the steering feedback process includes a process of calculating an output value obtained by multiplying a difference between the target steered angle and the converted steered angle by a steering control gain, and the characteristic change process includes a process of changing the response characteristic by referring to the steering control gain as the plant state and using the steering control gain as an input.

13. The steering control device according to claim 2, wherein the motor is a reaction force motor configured to apply a steering reaction force to the operation member, the plant includes a reaction force actuator including the reaction force motor, and a steering actuator, the steering actuator includes a steering motor that is mechanically connected to a steered wheel of the vehicle and is configured to apply a steering force for steering the steered wheel, the torque feedback process, the operation process, and the characteristic change process are a reaction force process related to operation of a drive circuit for the reaction force motor, the steering control device is configured to perform a steering process including a steering feedback process and a steering operation process, the steering feedback process includes a process of calculating a steering manipulated variable for controlling a converted steered angle to a target steered angle by feedback control, the converted steered angle is information acquirable in the steering actuator, the steering operation process is a process of operating a drive circuit for the steering motor based on the steering manipulated variable, the steering feedback process includes a process of calculating an output value obtained by multiplying a difference between the target steered angle and the converted steered angle by a steering control gain, and the characteristic change process includes a process of changing the response characteristic by referring to the steering control gain as the plant state and using the steering control gain as an input.

14. The steering control device according to claim 3, wherein the motor is a reaction force motor configured to apply a steering reaction force to the operation member, the plant includes a reaction force actuator including the reaction force motor, and a steering actuator, the steering actuator includes a steering motor that is mechanically connected to a steered wheel of the vehicle and is configured to apply a steering force for steering the steered wheel, the torque feedback process, the operation process, and the characteristic change process are a reaction force process related to operation of a drive circuit for the reaction force motor, the steering control device is configured to perform a steering process including a steering feedback process and a steering operation process, the steering feedback process includes a process of calculating a steering manipulated variable for controlling a converted steered angle to a target steered angle by feedback control, the converted steered angle is information acquirable in the steering actuator, the steering operation process is a process of operating a drive circuit for the steering motor based on the steering manipulated variable, the steering feedback process includes a process of calculating an output value obtained by multiplying a difference between the target steered angle and the converted steered angle by a steering control gain, and the characteristic change process includes a process of changing the response characteristic by referring to the steering control gain as the plant state and using the steering control gain as an input.

15. The steering control device according to claim 1, wherein the motor is a reaction force motor configured to apply a steering reaction force to the operation member, the plant includes a reaction force actuator including the reaction force motor, and a steering actuator, the steering actuator includes a steering motor that is mechanically connected to a steered wheel of the vehicle and is configured to apply a steering force for steering the steered wheel, the torque feedback process, the operation process, and the characteristic change process are a reaction force process related to operation of a drive circuit for the reaction force motor, the steering control device is configured to perform a steering process including a steering feedback process and a steering operation process, the steering feedback process includes a process of calculating a steering manipulated variable for controlling a converted steered angle to a target steered angle by feedback control, the converted steered angle is information acquirable in the steering actuator, the steering operation process is a process of operating a drive circuit for the steering motor based on the steering manipulated variable, the steering operation process includes:

a steering current feedback process for calculating a steering current manipulated variable by feedback control so that an actual steering current flowing through the steering motor reaches a target steering current obtained based on the steering manipulated variable; and a process of operating the drive circuit for the steering motor based on the steering current manipulated variable, the steering current feedback process includes a process of calculating the steering current manipulated variable based on an output value obtained by multiplying a difference between the target steering current and the actual steering current by a steering current control gain, and the characteristic change process includes a process of changing the response characteristic by referring to the steering current control gain as the plant state and using the steering current control gain as an input.

16. The steering control device according to claim 2, wherein the motor is a reaction force motor configured to apply a steering reaction force to the operation member, the plant includes a reaction force actuator including the reaction force motor, and a steering actuator, the steering actuator includes a steering motor that is mechanically connected to a steered wheel of the vehicle and is configured to apply a steering force for steering the steered wheel, the torque feedback process, the operation process, and the characteristic change process are a reaction force process related to operation of a drive circuit for the reaction force motor, the steering control device is configured to perform a steering process including a steering feedback process and a steering operation process, the steering feedback process includes a process of calculating a steering manipulated variable for controlling a converted steered angle to a target steered angle by feedback control, the converted steered angle is information acquirable in the steering actuator, the steering operation process is a process of operating a drive circuit for the steering motor based on the steering manipulated variable, the steering operation process includes:

a steering current feedback process for calculating a steering current manipulated variable by feedback control so that an actual steering current flowing through the steering motor reaches a target steering current obtained based on the steering manipulated variable; and a process of operating the drive circuit for the steering motor based on the steering current manipulated variable, the steering current feedback process includes a process of calculating the steering current manipulated variable based on an output value obtained by multiplying a difference between the target steering current and the actual steering current by a steering current control gain, and the characteristic change process includes a process of changing the response characteristic by referring to the steering current control gain as the plant state and using the steering current control gain as an input.

17. The steering control device according to claim 3, wherein the motor is a reaction force motor configured to apply a steering reaction force to the operation member, the plant includes a reaction force actuator including the reaction force motor, and a steering actuator, the steering actuator includes a steering motor that is mechanically connected to a steered wheel of the vehicle and is configured to apply a steering force for steering the steered wheel, the torque feedback process, the operation process, and the characteristic change process are a reaction force process related to operation of a drive circuit for the reaction force motor, the steering control device is configured to perform a steering process including a steering feedback process and a steering operation process, the steering feedback process includes a process of calculating a steering manipulated variable for controlling a converted steered angle to a target steered angle by feedback control, the converted steered angle is information acquirable in the steering actuator, the steering operation process is a process of operating a drive circuit for the steering motor based on the steering manipulated variable, the steering operation process includes:

a steering current feedback process for calculating a steering current manipulated variable by feedback control so that an actual steering current flowing through the steering motor reaches a target steering current obtained based on the steering manipulated variable; and a process of operating the drive circuit for the steering motor based on the steering current manipulated variable, the steering current feedback process includes a process of calculating the steering current manipulated variable based on an output value obtained by multiplying a difference between the target steering current and the actual steering current by a steering current control gain, and the characteristic change process includes a process of changing the response characteristic by referring to the steering current control gain as the plant state and using the steering current control gain as an input.

* * * * *